(12) United States Patent
Kuroiwa et al.

(10) Patent No.: US 11,480,156 B2
(45) Date of Patent: Oct. 25, 2022

(54) METHOD OF EVALUATING QUALITY OF WIND TURBINE BLADE

(71) Applicant: MITSUBISHI HEAVY INDUSTRIES, LTD., Tokyo (JP)

(72) Inventors: Takao Kuroiwa, Tokyo (JP); Kouji Esaki, Tokyo (JP); Kentaro Shindo, Tokyo (JP); Masakazu Kamibayashi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 288 days.

(21) Appl. No.: 16/596,804

(22) Filed: Oct. 9, 2019

(65) Prior Publication Data

US 2020/0124031 A1 Apr. 23, 2020

(30) Foreign Application Priority Data

Oct. 17, 2018 (JP) .............................. JP2018-195713
Oct. 25, 2018 (JP) .............................. JP2018-200761

(51) Int. Cl.
*G01N 29/04* (2006.01)
*G01N 29/44* (2006.01)
(Continued)

(52) U.S. Cl.
CPC ............... *F03D 17/00* (2016.05); *F01D 5/18* (2013.01); *G01N 29/043* (2013.01);
(Continued)

(58) Field of Classification Search
CPC ............ G01N 29/043; G01N 29/4427; G01N 29/0645; G01N 29/11; G01N 29/265;
(Continued)

(56) References Cited

U.S. PATENT DOCUMENTS 8,418,560 B2 4/2013 Faidi et al.
8,522,615 B1 * 9/2013 Brady .................. G01N 29/348
73/579

(Continued)

FOREIGN PATENT DOCUMENTS

EP 0060952 A2 9/1982
EP 2667187 A1 11/2013
(Continued)

OTHER PUBLICATIONS

Office Action for Japanese Application No. 2018-195713 dated Jan. 7, 2020; 4 pp.

(Continued)

*Primary Examiner* — Suman K Nath
(74) *Attorney, Agent, or Firm* — Kanesaka Berner and Partners LLP

(57) ABSTRACT

A method of evaluating quality of a wind turbine blade which has a hollow structure where an interior space of the wind turbine blade is surrounded by an outer skin which includes a laminated body includes: setting a scanning line on at least a part of an inner wall surface or an outer wall surface of the outer skin; and moving an ultrasound probe along the scanning line; generating a cross-sectional image corresponding to the scanning line, on the basis of a position of the ultrasound probe or a reflection echo to detect an indication whose echo level is greater than a first threshold; obtaining an inclination of the indication with respect to a reference line as a first parameter; and evaluating the lifetime or the breakage risk of the wind turbine blade on the basis of the first parameter.

8 Claims, 21 Drawing Sheets

(51) Int. Cl.
*F03D 17/00* (2016.01)
*F01D 5/18* (2006.01)

(52) U.S. Cl.
CPC . *G01N 29/4427* (2013.01); *G01N 2291/0289* (2013.01); *G01N 2291/2693* (2013.01)

(58) Field of Classification Search
CPC ........... G01N 29/30; G01N 2291/0289; G01N 2291/2693; F03D 17/00; F03D 1/0675; F01D 5/18; F05B 2260/83
See application file for complete search history.

(56) References Cited

U.S. PATENT DOCUMENTS

| | | |
|---|---|---|
| 2009/0169392 A1 | 7/2009 | Kuroiwa et al. |
| 2011/0037190 A1 | 2/2011 | Stiesdal |
| 2013/0149154 A1 | 6/2013 | Kuroiwa et al. |
| 2013/0188858 A1 | 7/2013 | Lin et al. |
| 2014/0005840 A1 | 1/2014 | Motzer et al. |
| 2014/0305216 A1 | 10/2014 | Hafenrichter et al. |
| 2015/0098820 A1* | 4/2015 | Dixon ................. F03D 1/0675 416/1 |
| 2016/0320348 A1 | 11/2016 | Boudreau et al. |
| 2017/0225804 A1 | 8/2017 | Hafenrichter et al. |
| 2017/0284971 A1 | 10/2017 | Hall |

FOREIGN PATENT DOCUMENTS

| | | |
|---|---|---|
| EP | 2944953 A1 | 11/2015 |
| JP | S57154055 A | 9/1982 |
| JP | H03271566 A | 12/1991 |
| JP | H07174734 A | 7/1995 |
| JP | H09133664 A | 5/1997 |
| JP | H11160295 A | 6/1999 |
| JP | 2007255366 A | 10/2007 |
| JP | 2011038520 A | 2/2011 |
| JP | 2011047905 A | 3/2011 |
| JP | 2013152227 A | 8/2013 |
| JP | 2016070852 A | 5/2016 |
| JP | 2017535758 A | 11/2017 |
| WO | 2013084361 A1 | 6/2013 |

OTHER PUBLICATIONS

Decision of Refusal for Japenese Application No. 2018-195713 dated Jun. 16, 2020; 8pp.
Office Action for Japanese Application No. 2018-195713 dated Apr. 27, 2021; 15pp.

* cited by examiner

POSITION OF ULTRASOUND PROBE

POSITION OF ULTRASOUND PROBE

METHOD OF EVALUATING QUALITY OF WIND TURBINE BLADE

RELATED APPLICATIONS

The present application claims priority from Japanese Application Number 2018-195713 filed Oct. 17, 2018 and Japanese Application Number 2018-200761 filed Oct. 25, 20182018, the disclosures of which are hereby incorporated by reference herein in their entirety.

TECHNICAL FIELD

The present disclosure relates to a method of evaluating quality of a wind turbine blade including a laminated body.

BACKGROUND ART

A known wind turbine blade formed of a laminated body includes fiber reinforced plastic such as carbon fiber reinforced plastic (CFRP) and glass fiber reinforced plastic (GFRP). In such a wind turbine blade, warp of the laminated body may occur inside the wind turbine blade, or delamination may occur, which is a defect caused by such warp or the like, and the quality such as the strength of the wind turbine blade may be affected. Thus, it is necessary to check the above defects by checking the wind turbine blade during the production process or maintenance under operation. For instance, Patent Document 1 discloses a method of evaluating the strength of a wind turbine blade, by detecting the condition of the inside of the laminated body by scanning the wind turbine blade including the laminated body and measuring parameters such as length and height under the condition.

CITATION LIST

Patent Literature

Patent Document 1: U.S. Pat. No. 8,418,560B

SUMMARY

Problems to be Solved

In Patent Document 1, with regard to the condition of the inside of the laminated body that exists in the outer skin of the wind turbine blade, strength evaluation is performed using parameters related to the shape such as length and height. Such evaluation is local evaluation on the inner condition of the outer skin, and is not suitable to evaluate elements that have breadth such as warp of the laminated body and delamination. Furthermore, in some cases, it is difficult to clearly determine the shape of warp or delamination that exists in the laminated body (for instance, the boundary to the normal region may be unclear), and thus the technique disclosed in Patent Document 1 is not suitable to evaluate. Furthermore, to perform evaluation accurately on the basis of the shape related to the above condition, it is necessary to accurately determine the shape characteristics of the outer skin. However, to measure the shape characteristics accurately, it is necessary to carry out scanning many times, which may increase the time and cost required for checking.

Furthermore, in Patent Document 1, the inner condition of the laminated body of the wind turbine blade is detected by scanning using a probe. However, a wind turbine blade used for a large wind turbine power generation apparatus has an extremely large size, and thus it is not easy to detect defects effectively from a broad check range by probe scanning. Thus, the checking work is currently laborious and costly.

At least one embodiment of the present invention was made in view of the above issue, and an object is to provide a method of evaluating quality of a wind turbine blade whereby it is possible to evaluate quality of a wind turbine blade including a laminated body effectively and simply.

Solution to the Problems (1) According to at least one embodiment of the present invention, a method of evaluating quality of a wind turbine blade which has a hollow structure where an interior space of the wind turbine blade is surrounded by an outer skin which includes a laminated body, includes: an ultrasound probe scanning step of moving an ultrasound probe along at least one scanning line which is set on at least a part of an inner wall surface or an outer wall surface of the outer skin; a cross-sectional image generating step of generating a cross-sectional image of the outer skin corresponding to the at least one scanning line, on the basis of a position of the ultrasound probe on the at least one scanning line and a reflection echo at the position; an indication detection step of detecting, from the cross-sectional image, an indication having an echo level that is greater than a first threshold; a first parameter calculation step of obtaining, as a first parameter, an inclination of the indication with respect to the scanning line or a reference line included in the cross-sectional image; and an evaluation step of evaluating a lifetime or a breakage risk of the wind turbine blade on the basis of the first parameter.

According to the above method (1), it is possible to evaluate the quality of the wind turbine blade effectively and simply by quantitatively detecting, as the first parameter, the warp included in the outer skin formed of laminated bodies, from the inclination of the indication included in the cross-sectional image obtained by scanning the ultrasonic probe.

(2) In some embodiments, the above method (1) further includes a delamination detection step of detecting, from the cross-sectional image, a delamination having an echo level that is greater than a second threshold which is set to be greater than the first threshold; and a second parameter calculation step of obtaining, as a second parameter, a characteristic amount of the delamination. The evaluation step includes evaluating the lifetime or the breakage risk of the wind turbine blade on the basis of the first parameter and the second parameter.

According to the above method (2), it is possible to evaluate the quality of the wind turbine blade more precisely by quantitatively detecting, as the second parameter, the delamination included in the outer skin formed of laminated bodies, and using the second parameter as an evaluation index along with the above described first parameter related to the warp of the indication.

(3) In some embodiments, in the above method (2), the evaluation step includes evaluating the lifetime or the breakage risk of the wind turbine blade so that the lifetime of the wind turbine blade decreases and/or the breakage risk of the wind turbine blade increases with an increase of the first parameter or the second parameter.

According to the above method (3), it is possible to quantitatively evaluate the lifetime and the breakage risk of the wind turbine blade on the basis of the magnitudes of the first parameter and the second parameter obtained by measurement.

(4) In some embodiments, in the above method (2), the second parameter is a length of the delamination along the scanning line.

According to the above method (4), it is possible to evaluate the lifetime and the breakage risk of the wind turbine blade precisely by adopting the length of the delamination along the blade span direction as the second parameter.

(5) In some embodiments, in the above method (2), if a plurality of the delaminations are detected from the cross-sectional image in the delamination detection step, the second parameter is a sum of lengths of the respective delaminations along a blade span direction.

According to the above method (5), in a case where a plurality of delaminations are detected from a single cross-sectional image, it is possible to evaluate the lifetime and the breakage risk of the wind turbine blade more precisely by using the total length of the plurality of delaminations as the second parameter.

(6) In some embodiments, in the above method (2), the at least one scanning line includes a plurality of scanning lines which extend parallel to one another, and if a plurality of delaminations are detected from at least two of the plurality of scanning lines, the second parameter is a sum of characteristic amounts of the delaminations detected from the at least two respective scanning lines.

According to the above method (6), it is possible to perform quality evaluation taking into account the second-dimensional distribution of delaminations in the outer skin by using, as the second parameter, the sum of the characteristic amounts of the delaminations detected on different scanning lines.

(7) In some embodiments, in the above method (6), the second parameter is obtained by applying greater weights to the characteristic amounts of the delaminations with greater depths detected from the at least two respective scanning lines and adding the weighted characteristic amounts of the delaminations.

According to the above method (7), when obtaining the total of the characteristic amounts of delaminations detected from different scanning lines as the second parameter, weights are applied in accordance with the depths of the respective delaminations. Accordingly, it is possible to evaluate quality taking into account the influence of the depth position of delamination on the lifetime or breakage risk of the outer skin.

(8) In some embodiments, in the above method (6), the second parameter is obtained by applying weights to the characteristic amounts of the delaminations detected from the at least two respective scanning lines using weight coefficients which are set according to the number of the delaminations detected in the cross-sectional image, and adding the weighted characteristic amounts of the delaminations.

According to the above method (8), when obtaining the total of the characteristic amounts of delaminations detected from different scanning lines as the second parameter, weights are applied in accordance with the number of the delaminations included in the cross-sectional image corresponding to the respective scanning lines. Accordingly, it is possible to evaluate quality taking into account the influence of the number of delaminations that exist on respective scanning lines on the lifetime or breakage risk of the outer skin.

(9) According to at least one embodiment of the present invention, a method of evaluating quality of a wind turbine blade which has a hollow structure where an interior space of the wind turbine blade is surrounded by an outer skin which includes a laminated body, includes: a step of setting at least one scanning line along a blade span direction of the wind turbine blade on at least a part of an inner wall surface or an outer wall surface of the outer skin; a step of moving an ultrasound probe along the at least one scanning line; and a step of generating a cross-sectional image of the outer skin corresponding to the at least one scanning line, on the basis of a position of the ultrasound probe on the at least one scanning line or a depth of a reflection source specified at the position.

According to the above method (9), the ultrasonic probe is moved along the scanning line set on the outer skin of the wind turbine blade. A cross-sectional image of the outer skin along the scanning line is obtained by associating the positions of the ultrasonic probe to the depths of the reflection sources specified at the respective positions. The accordingly obtained cross-sectional image includes information related to the condition inside the laminated bodies that exist in the outer skin, and thus it is possible to evaluate the quality of the wind turbine blade by analyzing the cross-sectional image. In particular, by setting the scanning line of the ultrasonic probe along the blade span direction, it is possible to efficiently detect defects that extend in a direction that intersects with the blade span direction. Defects that extend in a direction that intersects with the blade span direction are likely to affect the strength of the wind turbine blade. Thus, by detecting such defects efficiently, it is possible to evaluate the quality simply with a small load even when the wind turbine blade is a large-sized wind turbine blade.

(10) In some embodiments, in the above method (9), the outer skin includes a blade-thickness changing portion whose thickness changes along the blade span direction toward one of the inner wall surface or the outer wall surface, and wherein the at least one scanning line is set so as to pass through the blade-thickness changing portion.

According to the above method (10), by setting the scanning line so as to pass through the blade-thickness changing portion, it is possible to effectively evaluate the quality of the condition inside the laminated bodies of the blade-thickness changing portion.

(11) In some embodiments, in the above method (10), the blade-thickness changing portion is disposed on a blade root portion of the wind turbine blade.

According to the above method (11), it is possible to effectively evaluate the quality of the inner condition of the laminated bodies of the blade-thickness changing portion disposed on the blade root portion.

(12) In some embodiments, in the above method (9), the at least one scanning line forms an angle of less than 45 angular degrees with the blade span direction.

According to the above method (12), the scanning line is set so that the angle formed with the blade span direction is less than 45 angular degrees. When the scanning line is set as described above, defects that extend along a direction that intersects with the blade span direction are more likely to exist on the scanning line. Thus, it is possible to detect defects that have great influence on the quality of the wind turbine blade more efficiently.

(13) In some embodiments, in the above method (12), the at least one scanning line forms an angle of zero angular degrees with the blade span direction.

According to the above method (13), the scanning line is set so as to be parallel to the blade span direction. When the scanning line is set as described above, defects that extend along a direction that intersects with the blade span direction are more likely to exist on the scanning line. Thus, it is possible to detect defects that have great influence on the quality of the wind turbine blade more efficiently.

(14) In some embodiments, in the above method (9), the at least one scanning line includes a plurality of scanning lines which extend parallel to one another.

According to the above method (14), it is possible to evaluate quality such as defects over a broad range on the outer skin by setting a plurality of scanning lines that extend along the blade span direction.

(15) In some embodiments, in the above method (14), the outer skin includes a first member and a second member joined to one another, the first member and the second member corresponding to a pressure side and a suction side of the wind turbine blade respectively, and the plurality of scanning lines are set so as to be distributed on both sides of a center line along the blade span direction, for each of the first member and the second member.

According to the above method (15), by setting the scanning line on each side of the center line along the blade span direction (at the blade root portion in particular, for instance, the center line C indicated by a single-dotted chain line in FIG. 12) in each of the first member and the second member that form the wind turbine blade, it is possible to effectively evaluate the quality of the portion that has great influence on the blade strength and where defects are likely to develop experimentally.

Advantageous Effects

According to at least one embodiment of the present invention, it is possible to provide a method of evaluating quality of a wind turbine blade whereby it is possible to evaluate quality of a wind turbine blade including a laminated body effectively and simply.

DETAILED DESCRIPTION

Embodiments of the present invention will now be described with reference to the accompanying drawings.

It is intended, however, that unless particularly specified, dimensions, materials, shapes, relative positions and the like of components described in the embodiments shall be interpreted as illustrative only and not intended to limit the probe of the present invention.

Figure 1A:
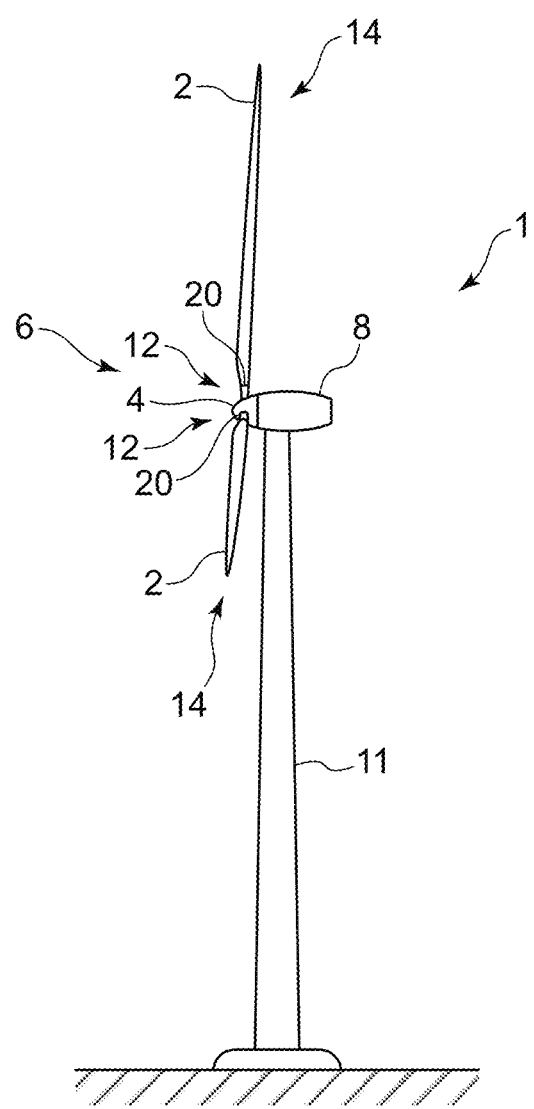
FIG. 1A is a schematic diagram illustrating an overall configuration of a wind turbine according to at least one embodiment of the present invention.
Figure 1B:
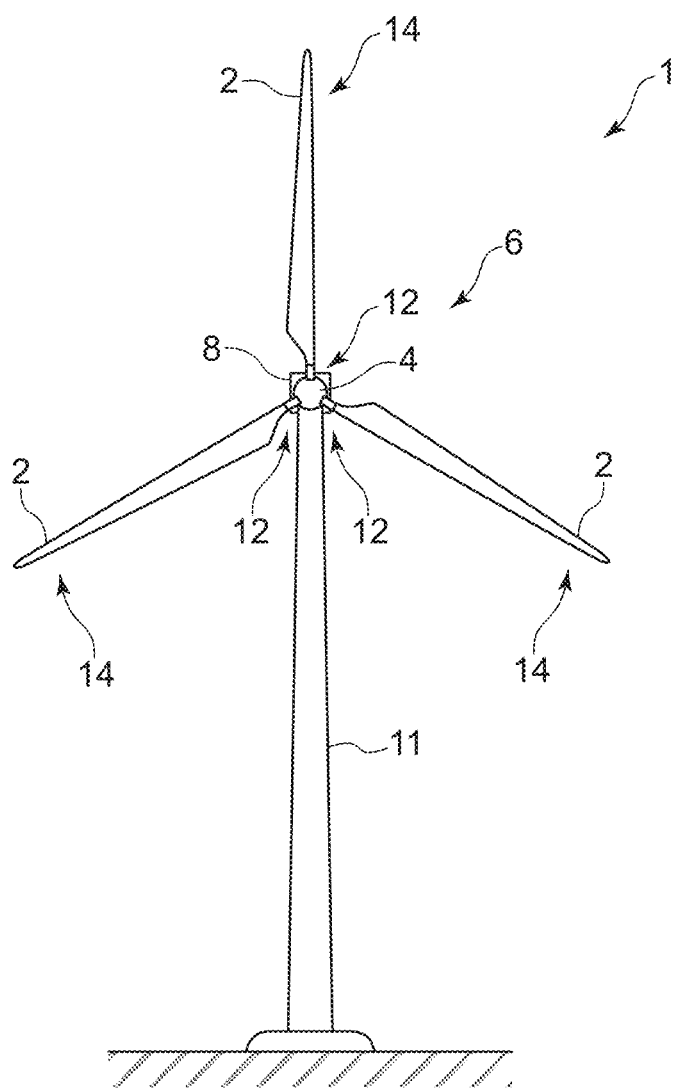
FIG. 1B is a schematic diagram illustrating an overall configuration of a wind turbine according to at least one embodiment of the present invention.

Firstly, the configuration of the wind turbine 1 having a wind turbine blade to be checked in the present invention will be described. FIGS. 1A and 1B are each a schematic diagram illustrating an overall configuration of the wind turbine 1 according to at least one embodiment of the present invention. FIG. 1A is a side view of the wind turbine 1 and FIG. 1B is a front view of the wind turbine 1.

The wind turbine 1 includes a wind turbine rotor 6 including at least one wind turbine blade 2 and a hub 4 to which the wind turbine blade 2 is mounted, a nacelle 8, and a tower 11 supporting the nacelle 8. In the example of FIGS. 1A and 1B, the wind turbine 1 includes three wind turbine blades 2 mounted to the hub 4. The wind turbine 1 is configured such that a wind turbine rotor 6 including the wind turbine blades 2 and the hub 4 rotates about the rotational axis of the wind turbine rotor 6 as the wind turbine blades 2 receive wind.

The wind turbine blade 2 depicted in FIGS. 1A and 1B includes a blade root portion 12 that constitutes an end portion at the side of the hub 4 and a blade tip portion 14 opposite thereto. The blade root portion 12 has a cylindrical shape and receives a bending moment that is transmitted from the wind turbine blade 2 to the hub 4.

The wind turbine 1 may be a wind turbine power generating apparatus. In this case, the nacelle 8 houses a generator and a power transmission mechanism for transmitting rotation of the wind turbine rotor 6 to the generator, and the wind turbine 1 may be configured such that the generator converts rotational energy transmitted from the wind turbine rotor 6 to the generator via the power transmission mechanism into electrical energy.

Figure 2:
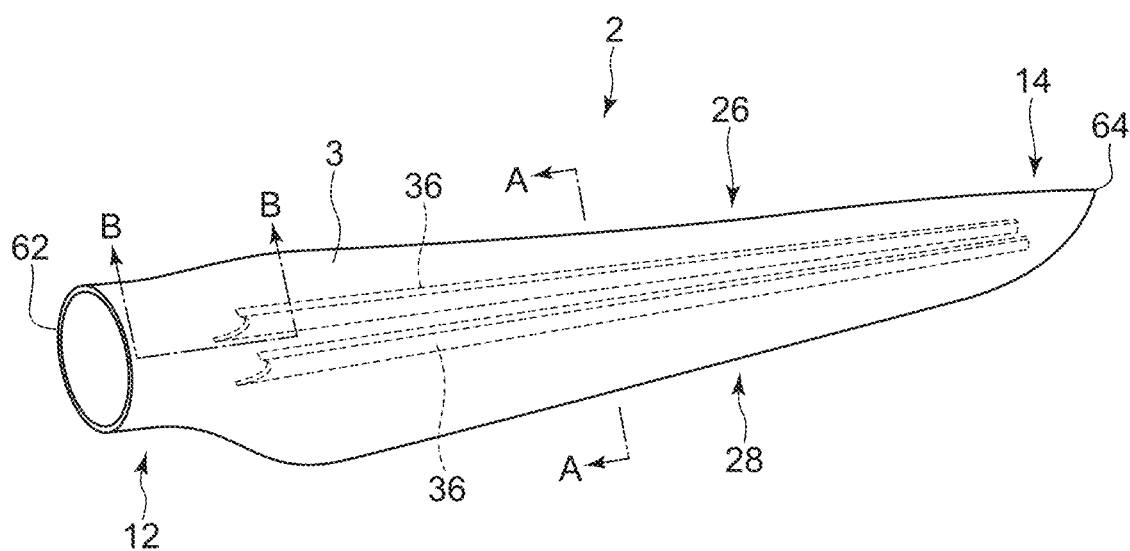
FIG. 2 is a schematic diagram illustrating an overall structure of the wind turbine blade depicted in FIGS. 1A and 1B.
Figure 3:
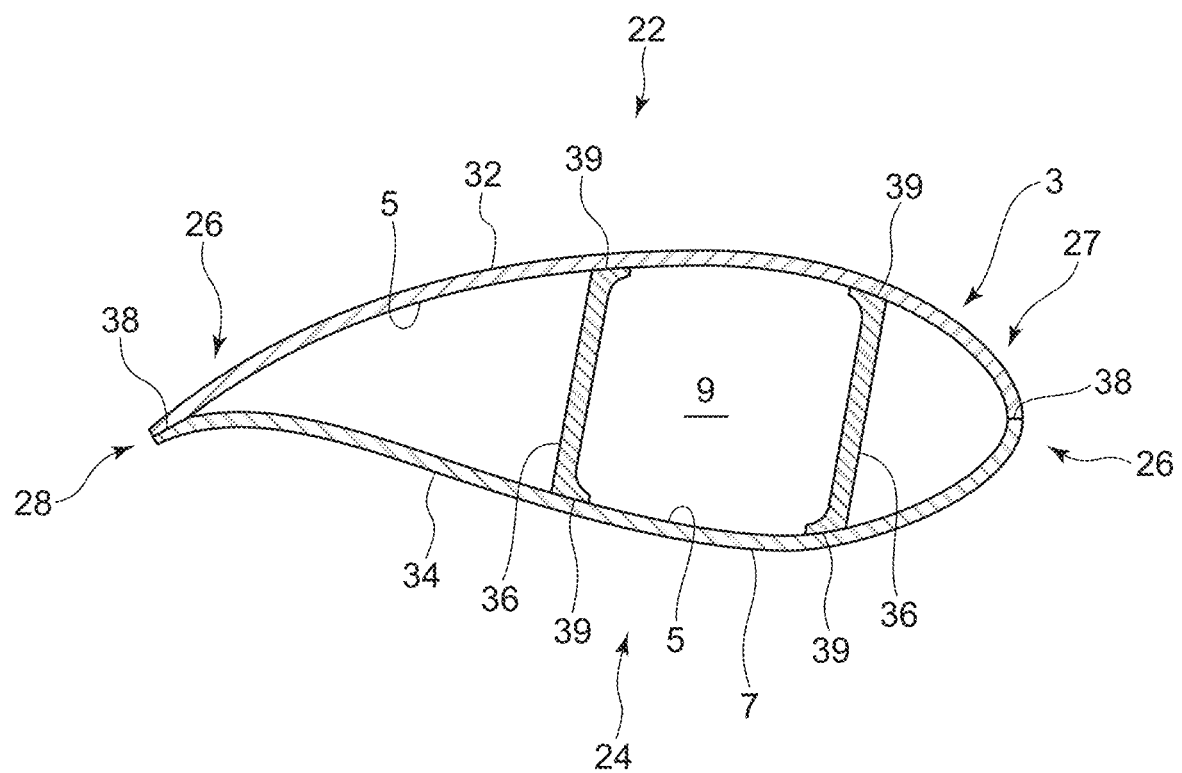
FIG. 3 is a cross-sectional view taken along line A-A in FIG. 2.
Figure 4:
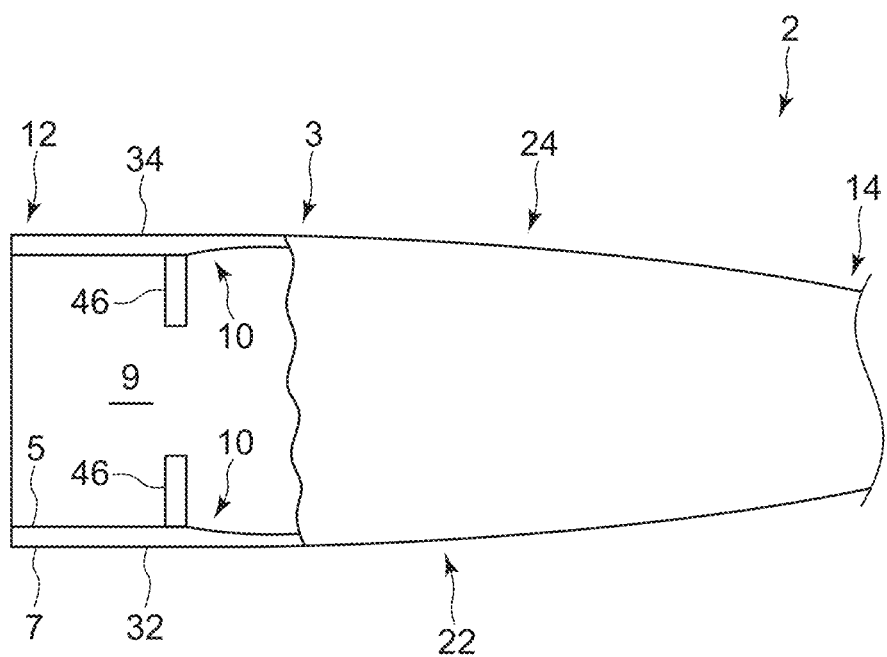
FIG. 4 is a partial cross-sectional view taken along line B-B in FIG. 2.

Next, with reference to FIGS. 2 to 4, the configuration of the wind turbine blade 2 will be described in detail. FIG. 2 is a schematic diagram illustrating an overall structure of the wind turbine blade 2 depicted in FIGS. 1A and 1B. FIG. 3 is a cross-sectional view taken along line A-A of FIG. 2, and FIG. 4 is a partial cross-sectional view taken along line B-B of FIG. 2.

The wind turbine blade 2 includes a blade body 3 formed by an outer skin having a hollow structure, and two shear webs 36 extending in the blade span direction of the wind turbine blade 2 inside the blade body 3. The wind turbine blade 2 is mounted to the hub 4 by using a bolt or the like at a blade root 62 being an end portion of the wind turbine blade 2 (see FIGS. 1A and 1B).

The other end portion opposite to the blade root 62 of the wind turbine blade 2 is a blade tip 64.

The outer skin that constitutes the blade body 3 is formed of a laminated body including fiber reinforced plastic such as carbon fiber reinforced plastic (CFRP) and glass fiber reinforced plastic (GFRP). As depicted in FIGS. 3 and 4, the outer skin includes the first member 32 that constitutes the pressure side 22 and the second member 34 that constitutes the suction side 24. The first member 32 and the second member 34 are joined to one another via an adhesive agent 38 at the leading edge 26 and the trailing edge 28 of the wind turbine blade 2, and are formed so as to surround the internal space 9. Furthermore, the shear web 36 and the inner wall surface 5 of the wind turbine blade 2 are joined to one another via an adhesive agent 39 at the pressure side 22 and the suction side 24 of the wind turbine blade 2.

The outer skin that constitutes the blade body 3 has an inner wall surface 5 and an outer wall surface 7. Furthermore, as depicted in FIG. 4, the outer skin has a blade-thickness changing portion 10 whose thickness changes along the blade span direction. The blade-thickness changing portion 10 may be disposed on at least one of the first member 32 or the second member 34, of the outer skin. Furthermore, the blade-thickness changing portion 10 may be disposed on at least one of the inner wall surface 5 or the outer wall surface 7 of the outer skin.

The blade-thickness changing portion 10 of the present working example has a flat outer wall surface 7 and a partially oblique inner wall surface 5. In this way, the blade thickness of the blade-thickness changing portion 10 increases from the blade tip 64 toward the blade root 62. The blade-thickness changing portion 10 having the above configuration extends in the circumferential direction from the first member 32 or the second member 34. Furthermore, the blade-thickness changing portion 10 is disposed on the blade root portion 12 of the blade body 3, so as to increase the strength of the blade root portion 12 where load is likely to concentrate during operation of the wind turbine 1.

Furthermore, the blade root portion 12 is a region closer to the blade root 62 rather than to the blade tip portion 14, and is defined as a region within approximate 10% from the blade root 62, of the entire blade length.

Furthermore, on the inner wall surface 5 of the outer skin, a partition wall plate 46 that protrudes toward the inner side of the blade body 3 is disposed. The partition wall plate 46 is formed so as to protrude substantially perpendicular toward the inner side from the inner wall surface 5 of the outer skin, and is fixed to the inner wall surface 5. The partition wall plate 46 is fixed to a relatively flat region of the inner wall surface 5 of the outer skin.

Figure 5:
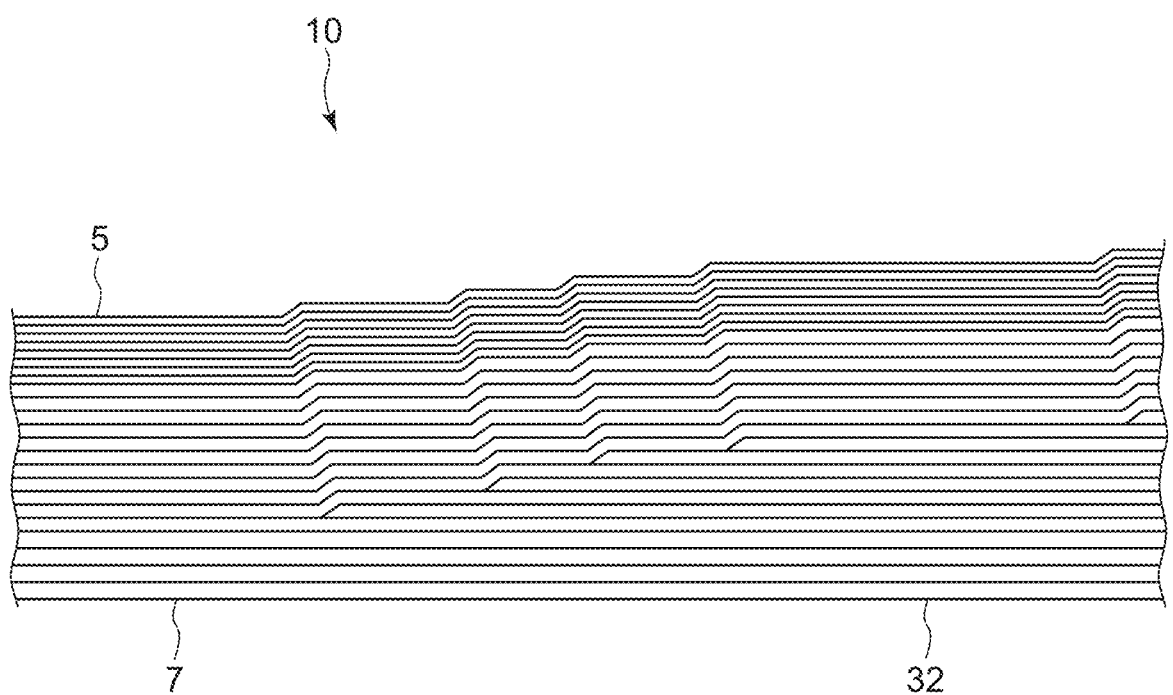
FIG. 5 is an enlarged cross-sectional view taken in the vicinity of a blade-thickness changing portion in FIG. 4.

FIG. 5 is an enlarged cross-sectional view taken in the vicinity of the blade-thickness changing portion 10 in FIG. 4. The outer skin that forms the blade body 3 is formed by laminating a plurality of laminated bodies. At the blade-thickness changing portion 10, the number of laminated bodies forming the outer skin changes in stages along the blade thickness direction, and thereby a ply-drop portion is formed.

Figure 6:
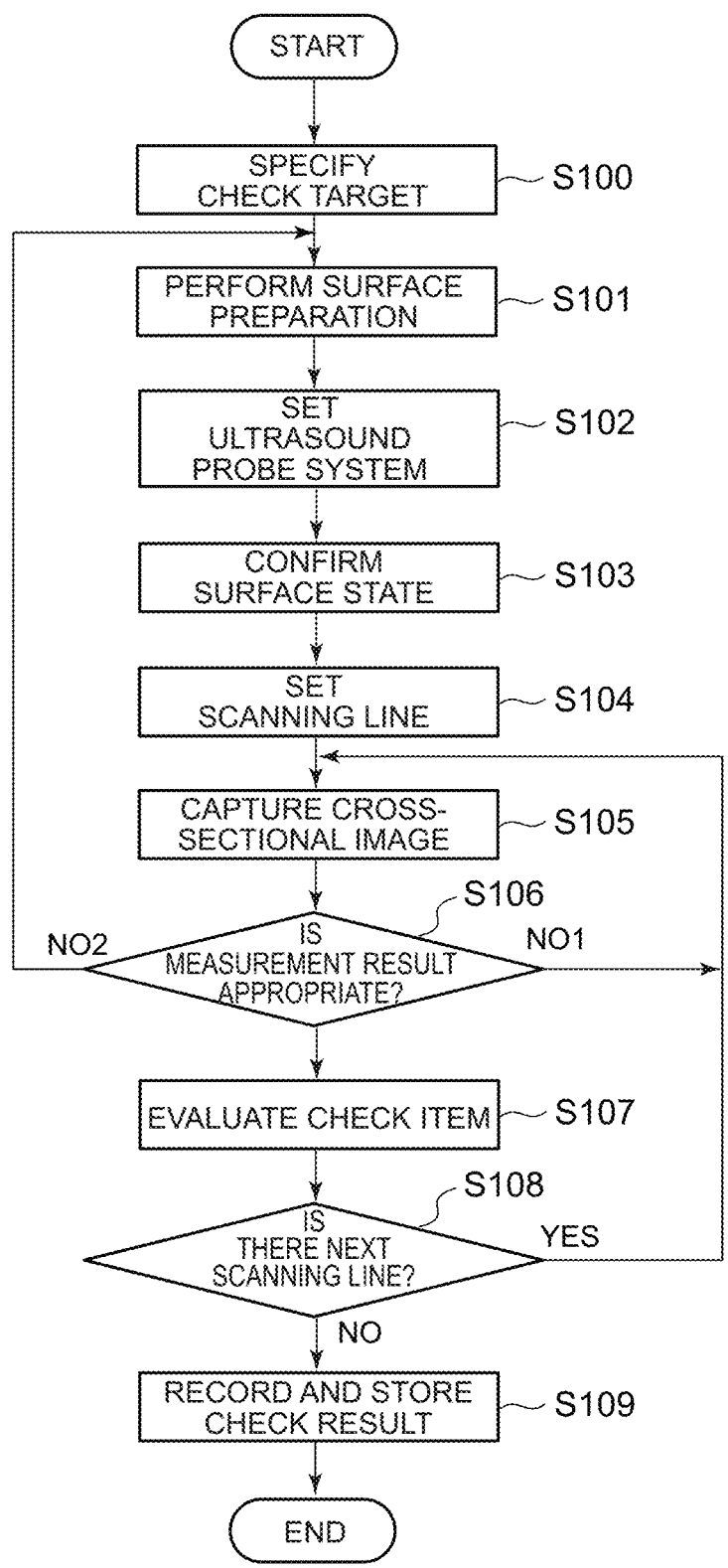
FIG. 6 is a flowchart showing steps of a method of checking a wind turbine blade according to an embodiment of the present invention.

Next, a method of checking the wind turbine blade 2 having the above configuration will be described. FIG. 6 is a flowchart showing steps of a method of checking the wind turbine blade 2 according to an embodiment of the present invention.

Firstly, a worker specifies the wind turbine blade 2 to be checked (step S100). In general, the above described wind turbine 1 is selected from a wind farm where a plurality of wind turbines 1 are set up in a predetermined site. Specifically, the worker selects the wind turbine 1 to be checked from a plurality of wind turbines 1 that constitute the wind farm, and selects the wind turbine blade 2 to be checked from at least one wind turbine blade 2 that the selected wind turbine 1 includes. Such determination of the wind turbine blade 2 is performed on the basis of an identification number associated with each wind turbine 1 of the wind farm, or an identification number associated with the wind turbine blade 2 of each wind turbine 1.

Next, surface preparation is performed on the wind turbine blade 2 determined in step S100 (step S101). The surface preparation of step S101 is performed for a check target range that is set on the outer skin in accordance with the surface state of the check target range. In the following description, of the outer skin of the wind turbine blade 2, the outer skin in the vicinity of the blade-thickness changing portion 10 is checked from the side of the inner wall surface 5. Unless otherwise stated, the same description applies to a case in which another region of the outer skin is checked.

Furthermore, depending on the surface state of the wind turbine blade 2, the surface preparation may be skipped.

For instance, if the surface of the wind turbine blade 2 has scratches or grime, the surface may be cleaned to remove the same as surface preparation. Furthermore, if small unevenness (steps) that may impair measurement exists on the surface of the wind turbine blade 2, the surface may be smoothed by sanding or the like as surface preparation. Performing such surface preparation makes it possible to obtain a high check accuracy.

Furthermore, in a case where a surface having unevenness like the blade-thickness changing portion 10 is to be checked as a check target as in the present working example, a putty material 20 (or FRP plate) may be applied to the blade-thickness changing portion 10 as surface preparation. As described below, while the check of the present working example includes scanning the inner wall surface 5 to be checked while causing an ultrasound probe 50 to be in contact with the inner wall surface 5, unevenness like the blade-thickness changing portion 10 may impair suitable contact between the measurement surface 50*a* of the ultrasound probe 50 and the surface of the outer skin, and the check accuracy may deteriorate. Thus, the putty material 20 (or FRP plate) or the like may be applied to the blade-thickness changing portion 10 to smoothen the inner wall surface 5 to be checked. Accordingly, it is possible to cause the ultrasound probe 50 to be in contact with the inner wall surface 5 suitably, and achieve a suitable check accuracy.

Figure 7:
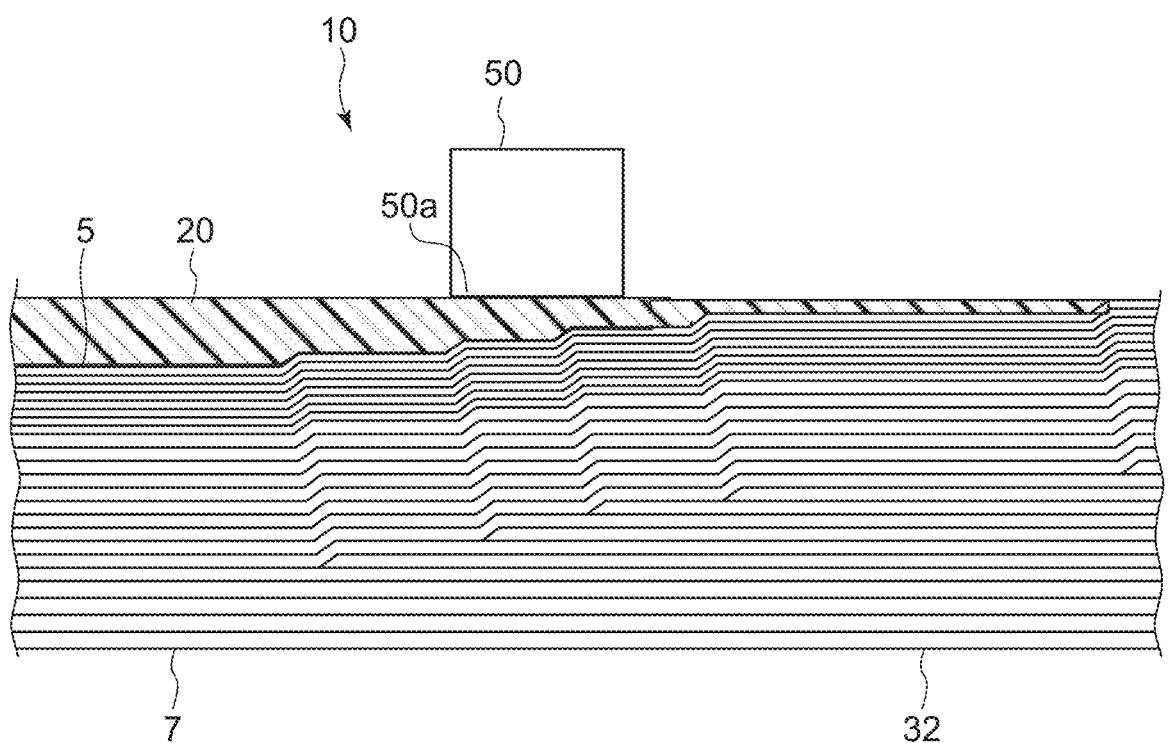
FIG. 7 is a diagram showing an example of application of a putty material (or FRP plate, for instance) to the blade-thickness changing portion in FIG. 5.

FIG. 7 is a diagram showing an example of application of the putty material 20 (or FRP plate, for instance) to the blade-thickness changing portion 10 in FIG. 5. As described above, the blade thickness of the blade-thickness changing portion 10 changes along the blade span direction. Thus, if the ultrasound probe 50 is caused to be in contact with the blade-thickness changing portion 10 without any measure, the unevenness that exists on the inner wall surface 5 may create a gap between the inner wall surface 5 and the measurement surface 50a of the ultrasound probe 50, and the measurement accuracy may deteriorate. Thus, as depicted in FIG. 7, smoothening preparation is performed by applying the putty material 20 (or FRP plate) so as to fill in the unevenness on the inner wall surface 5. Accordingly, the surface at the side of the inner wall surface 5 becomes flat so as to be substantially parallel to the outer wall surface 7, and no gap is formed between the inner wall surface 5 and the measurement surface 50a of the ultrasound probe 50, which makes it possible to achieve a suitable check accuracy.

In this example, the ultrasound probe 50 is caused to be in direct contact with the surface of a flat putty material 20 (or FRP plate). In another example, a plate material having a flat surface may be disposed on the putty material 20 (or FRP plate), and the ultrasound probe 50 may be caused to be in contact via the plate material. In this case, it is possible to obtain a flat contact surface to be in contact with the ultrasound probe 50 by merely placing a plate material on the putty material 20 (or FRP plate), without thoroughly smoothening the surface of the putty material 20 (or FRP plate).

Further, in a case where there is a structure that obstructs scanning of the ultrasound probe 50 on the inner wall surface 5, the structure may be removed at least partially when applying the putty material 20 or the FRP plate.

Figure 8:
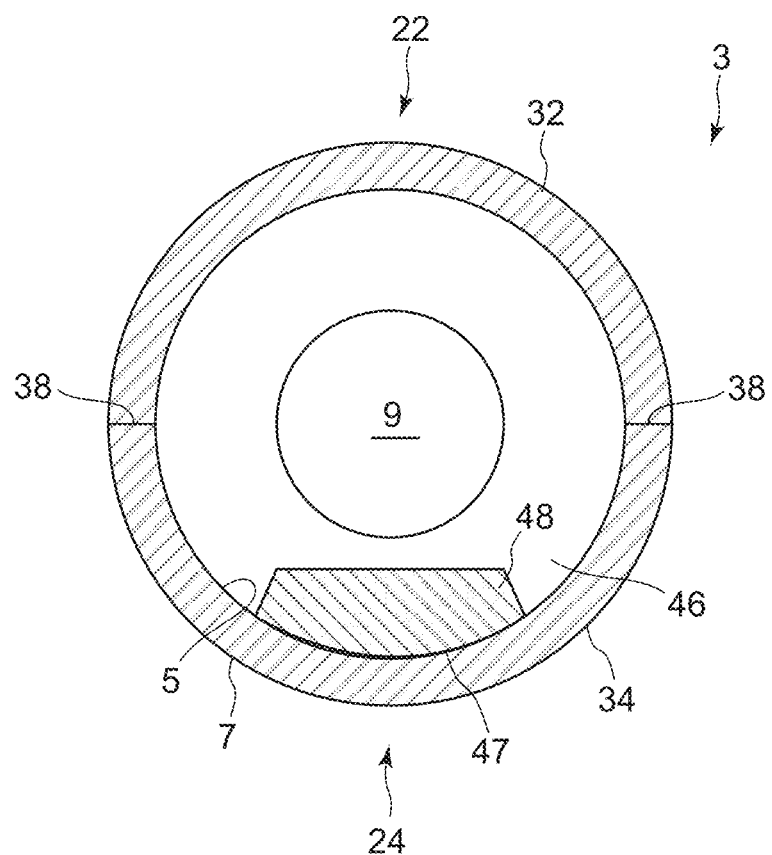
FIG. 8 is a schematic diagram showing an example of an excluded range of a partition wall plate as seen in the blade span direction.

Further, as depicted in FIG. 8, the installation space for the scanning line of the ultrasound probe 50 may be formed proactively by removing the partition wall plate 46 at least partially. In this case, while a flat check region may be formed by entirely removing the partition wall plate 46 disposed on the inner wall surface 5, the scanning line of the ultrasound probe 50 passing through the partition wall plate 46 may be ensured by removing the partition wall plate 46 partially.

FIG. 8 is a schematic diagram showing an example of a removal range 48 the partition wall plate 46 as seen in the blade span direction. In this example, the removal range 48 of the partition wall plate 46 is formed so as to obtain a substantially fan-shaped opening portion toward the inner side from the boundary line 47 to the inner wall surface 5 of the partition wall plate 46. This removal range 48 is set so that the surface on the boundary line 47 after removal becomes smooth with respect to the inner wall surface 5 surrounding the removal range 48. Further, the area of the removal range 48 may be formed to have a size such that the ultrasound probe 50 is capable of passing the removal range 48 upon scanning By removing the partition wall plate 46 not entirely but partially, it is possible to ensure an intended scanning line while reducing or omitting the work to repair the partition wall plate 46 after completion of check.

Next, various settings of the ultrasound probe system for check are performed (step S102). An ultrasound probe system is a system capable of generating a cross-sectional image on the basis of ultrasound waves transmitted from the ultrasound probe 50, and displaying the cross-sectional image on a display device such as a monitor. Since hardware and software related to an ultrasound probe system are already known, they are not described here in detail.

Figure 9A:
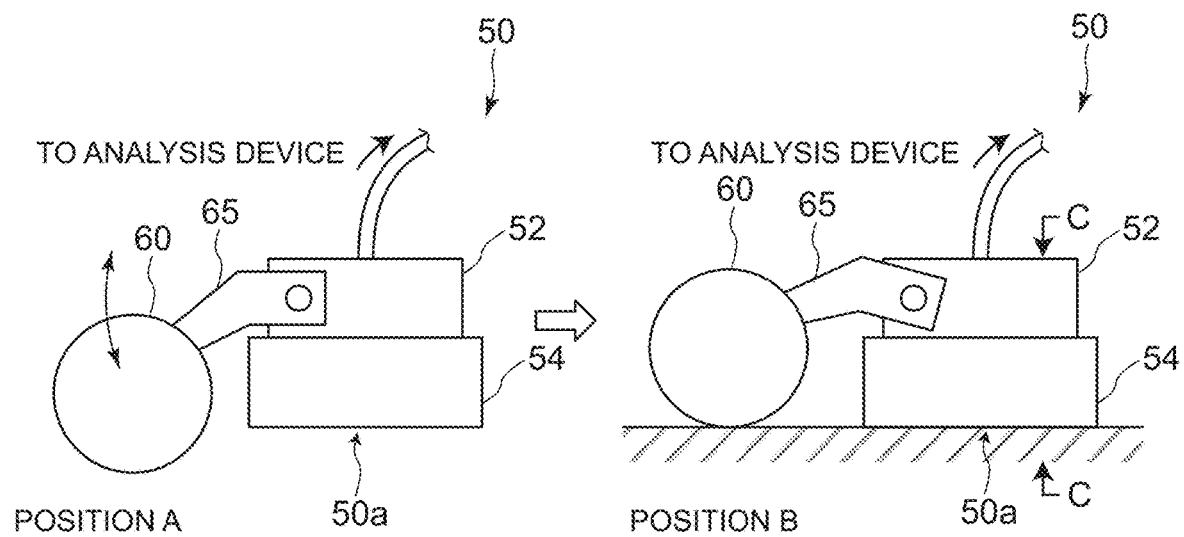
FIG. 9A is a schematic diagram showing an example of an ultrasound probe of an ultrasound probe system.
Figure 9B:
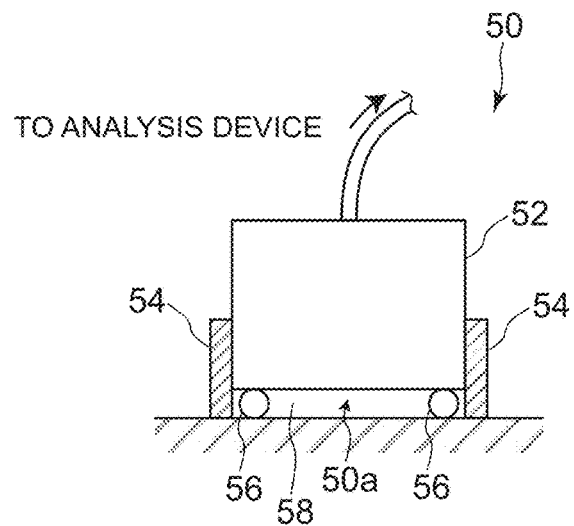
FIG. 9B is a schematic diagram showing an example of an ultrasound probe of an ultrasound probe system.

FIGS. 9A and 9B are each a schematic diagram showing an example of an ultrasound probe 50 of an ultrasound probe system. FIG. 9A is a side view of the external view of the ultrasound probe 50, and FIG. 9B is a C-C cross-sectional view of FIG. 9A.

The ultrasound probe 50 includes a probe body 52 having a measurement surface 50a for transmitting and receiving ultrasound waves. A plurality of elements (not depicted) for transmitting and receiving ultrasound waves are arranged in a predetermined pattern on the measurement surface 50a of the probe body 52. The measurement surface 50a has a substantially circular shape, and a side plate 54 having a substantially cylindrical shape is mounted along the periphery of the measurement surface 50a. A guide member 56 having a predetermined radius (e.g. stainless steel wire) is disposed along the rim portion of the measurement surface 50a, and the tip of the side plate 54 at the side of the measurement surface 50a protrudes outward from the measurement surface 50a so as to be flush with the guide member 56 on the measurement surface 50a. Accordingly, when the ultrasound probe 50 is caused to be in contact with the inner wall surface 5 to be measured, a gap 58 for a contact medium such as glycerin is formed between the measurement surface 50a and the inner wall surface 5 to be interposed therebetween, whereby it is possible to achieve a high check accuracy.

Furthermore, the ultrasound probe 50 includes an encoder 60 for determining the position of the ultrasound probe 50 upon scanning. The encoder 60 is mounted to the probe body 52 via an arm 65 that is rotatable. As depicted in the left side of FIG. 9A, when the measurement surface 50a of the ultrasound probe 50 is not in contact with the measurement target, the arm 65 is oriented obliquely downward by a biasing member (spring; not depicted), and the encoder 60 is at position A that protrudes downward from the measurement surface 50a. On the other hand, when the measurement surface 50a is in contact with the inner wall surface 5 to be checked, as indicated by arrow F in the drawing, the arm 65 rotates about the probe body 52 against the biasing force of the biasing member, and shifts to position B. At this time, the encoder 60 is in contact with the inner wall surface 5 forced by the biasing force of the biasing member, and rotates with scanning of the ultrasound probe 50. Thus, by detecting the count of the encoder 60, it is possible to determine the travel distance of the ultrasound probe 50.

Scanning of the ultrasound probe 50 may be performed manually by a worker, or may be automatically controlled by using an electronic computation device such as a computer. In this case, by reading the count value of the encoder 60 into the control device to detect the position of the ultrasound probe 50 and control a driving device for scanning (not depicted) on the basis of the detection result, it is possible to automate scanning of the ultrasound probe 50. Such automation is effective in reducing the work load, and makes it possible to perform check efficiently on a large-sized wind turbine blade 2 at low load and cost.

In step S102, various settings related to the ultrasound probe system are performed. These settings include various settings for obtaining a suitable cross-sectional image using the ultrasound probe system. Herein, examples of such settings described below include calibration of wedge delay (delay time of wedge) where correction is performed by applying time shift to reflection echoes received by each element of the ultrasound probe 50, calibration of the encoder 60, and calibration of gain.

Figure 10:
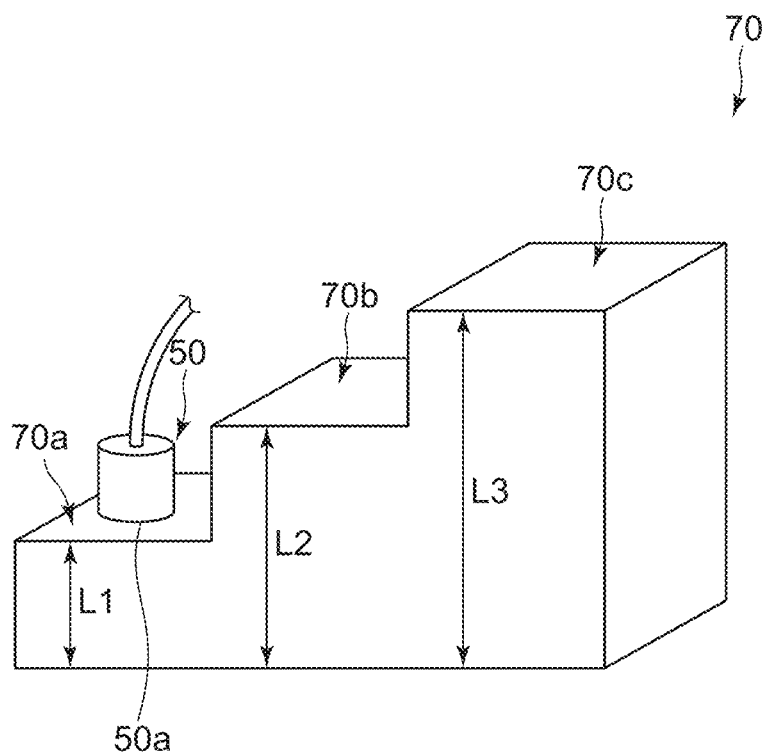
FIG. 10 is a schematic diagram showing an example of use of a calibration block.

Calibration of wedge delay is carried out by using a calibration block 70 as depicted in FIG. 10. The calibration block 70 is formed of the same material as the check target and has a predetermined shape. In the present working example, the calibration block has a shape formed by combining a first portion 70a having the first thickness L1 (e.g. 10 mm), a second portion 70b having the second thickness L2 (e.g. 20 mm), and a third portion 70c having the third thickness L3 (e.g. 30 mm).

The worker selects any one from the first portion 70a, the second portion 70b, or the third portion 70c of the calibration block 70, causes the measurement surface 50a of the ultrasound probe 50 to be in contact with the selected portion, irradiates the selected portion with ultrasound waves, and obtains a bottom echo from the reflection waves. Then, the worker confirms whether the reflection position (depth) of the obtained bottom echo matches the thickness at the selected portion. As a result, if the reflection position of the bottom echo does not match the thickness, adjustment of wedge delay is performed. Such adjustment of wedge delay is performed by displaying a cross-sectional image obtained by B scan along the scanning line using the ultrasound probe 50 on a display device such as a monitor, so that the depth of the bottom echo included in the cross-sectional image from the inner wall surface 5 matches the thickness of the calibration block 70. Accordingly, the display scale on the display device such as a monitor becomes appropriate.

While calibration using the calibration block 70 is described herein, calibration of the ultrasound probe 50 may be performed on the basis of whether the depth of the bottom echo obtained by advanced measurement by the ultrasound probe 50 of a defect-free region of the outer skin to be checked matches the thickness of the outer skin to be checked. Accordingly, it is possible to adjust the display scale of a cross-sectional image obtained in check appropriately.

In calibration of the encoder 60, scanning of the ultrasound probe 50 is performed along a predetermined path, and it is confirmed whether the measurement distance obtained by calculating the count value of the encoder 60 matches the actual travel distance of the ultrasound probe 50. As a result, if the measurement distance obtained by calculating the count value of the encoder 60 does not match the actual travel distance of the ultrasound probe, adjustment of the encoder 60 is performed (for example, adjustment of the initial position (zero), or calibration of the travel distance). By performing calibration of the encoder 60 as described above, it is possible to perform accurate check.

In particular, in a case where check is carried out by automatic control as described above, it is preferable to perform calibration of the driving device for scanning of the ultrasound probe 50 by performing a synchronized control of the control amount of the driving device and the count value of the encoder 60, along with calibration of the encoder 60. Accordingly, it is possible to effectively improve accuracy of automatic control.

The test surface where scanning of the ultrasound probe 50 is performed for calibration of the encoder 60 may be the inner wall surface 5 to be actually checked, or another test piece formed of the same material as the check target.

In calibration of gain, the ultrasound probe 50 actually measures a predetermined test piece, and actually obtains a bottom echo. The obtained bottom echo is displayed on the display device such as a monitor by strength, for instance. Thus, the display is adjusted to such a level that is recognizable by the worker (e.g. 50 to 100%). At this time, an adhesive agent (not depicted) may exist on the blade external surface in the vicinity of the partition wall plate 46, and thus reduction of the bottom echo at this location may be taken into account.

After the various settings of the ultrasound probe are performed as described above, the surface state of the inner wall surface 5 to be checked is confirmed (step S103). For instance, if the putty material 20 (or FRP plate) is applied to the inner wall surface 5, it is confirmed whether the application surface is sufficiently smoothened, whether the application range of the putty material 20 is appropriate, whether the putty material 20 (or FRP material) is not chipped, or whether the putty material 20 (or FRP) is not contaminated by air bubbles or foreign substances.

Next, a scanning line 80 for scanning of the ultrasound probe 50 is set on the check target (step S104). The setting target of the scanning line 80 may be at least a part of the inner wall surface 5 or the outer surface of the outer skin. In the present working example, the scanning line 80 is set on the inner wall surface 5, as described above. The scanning line 80 is set along the blade span direction of the wind turbine blade 2. Herein, "along the blade span direction" means that the scanning direction has some blade span direction component (e.g. the angle formed between the blade span direction and the scanning direction is not 90 degrees). The outer skin to be checked in the present working example has the blade-thickness changing portion 10 including a ply-drop where the lamination number of the laminated bodies changes along the blade span direction. Thus, warp of the laminated bodies that is not predicted in design may occur in the blade-thickness changing portion 10. When warp of an unanticipated level occurs, an unanticipated force acts on the laminated bodies, and a situation where delamination may occur is likely to occur. Thus, by setting the scanning line 80 along the blade span direction as described above, it is possible to focus on checking a region where delamination (separation) may occur (blade-thickness changing portion 10).

Preferably, the scanning line 80 may be set so as to form an angle of less than 45 angular degrees with the blade span direction. More preferably, the scanning line 80 may be set so as to form an angle of zero angular degrees with the blade span direction. In the wind turbine blade 2, compared to defects that extend along the blade span direction, defects that extend in a direction that intersects with the blade span direction have a great influence on the strength, for instance. When the scanning line 80 is set as described above, upon scanning of the ultrasound probe 50, defects that exist in a direction that intersects with the blade span direction are more likely to exist on the scanning line 80, and thus it is possible to detect the inner condition of the laminated bodies which have a great influence on the quality of the wind turbine blade 2 more effectively.

Figure 11:
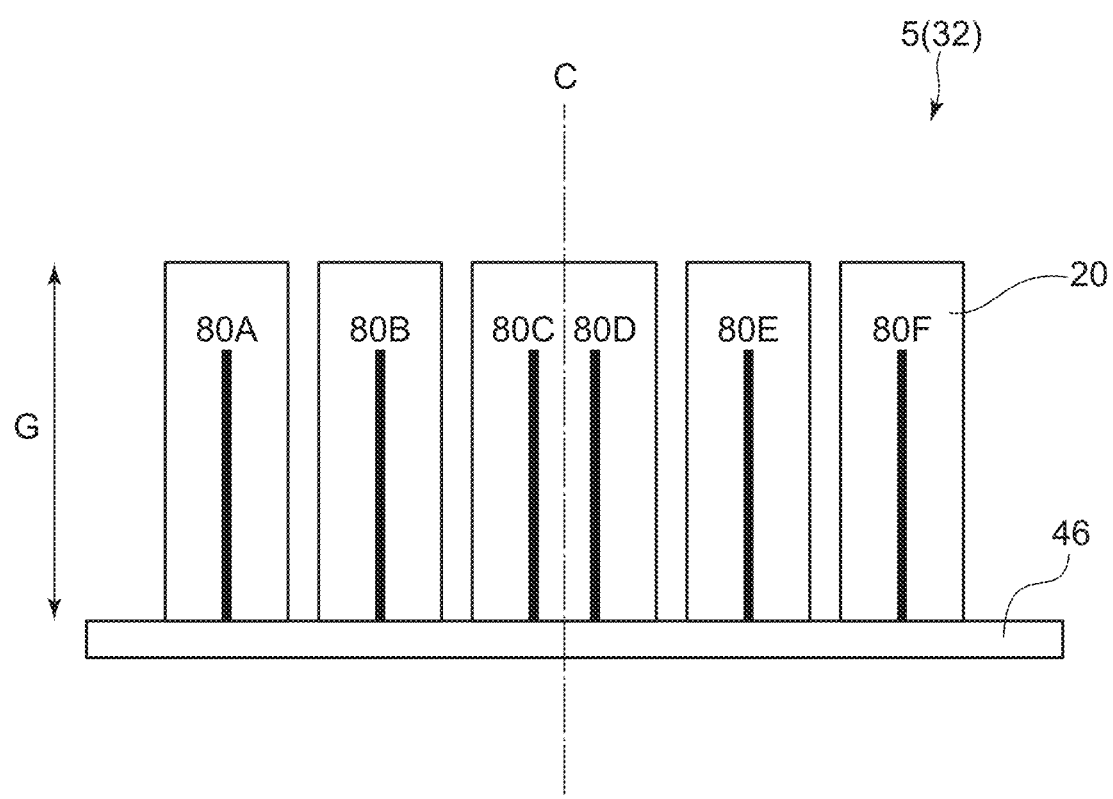
FIG. 11 is a schematic diagram showing an example of a scanning line set on an inner wall surface of the first member.
Figure 12:
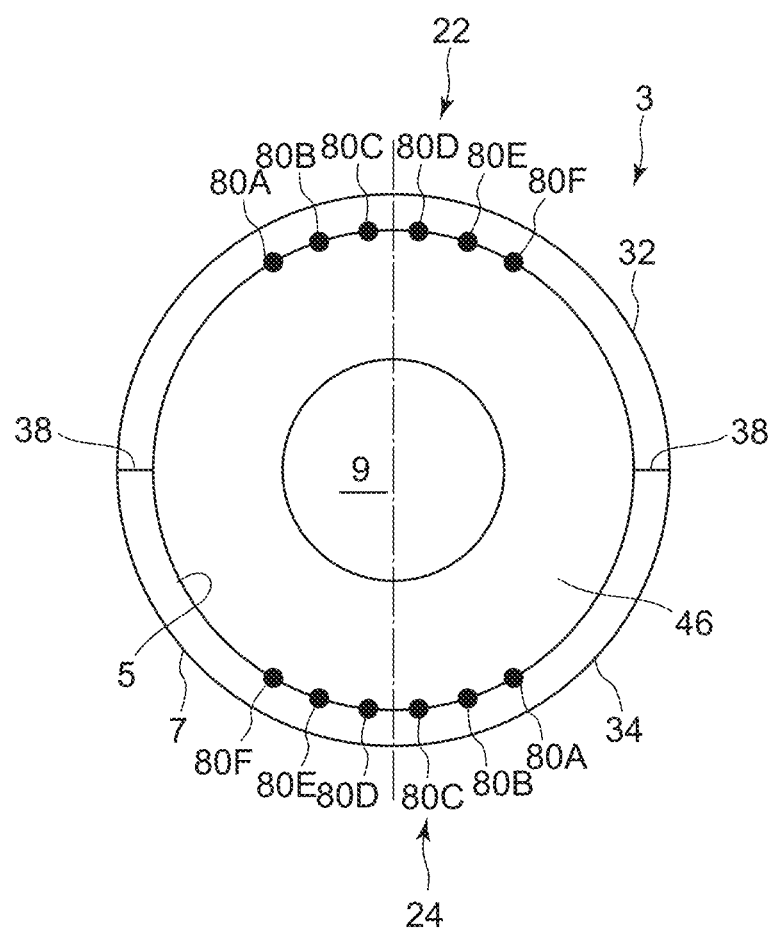
FIG. 12 is a schematic diagram showing a setting example of the scanning line in FIG. 11 from the blade span direction.

FIG. 11 is a schematic diagram showing an example of the scanning line 80 set on the inner wall surface 5 of the first member 32, and FIG. 12 is a schematic diagram of a setting example of the scanning line 80 of FIG. 11 shown in the blade span direction. While only the scanning line 80 set on the inner wall surface 5 of the first member 32 of the outer skin is shown in FIG. 11, similar description applies also to the scanning line 80 set on the inner wall surface 5 of the second member 34.

In this setting example, as the scanning line 80, a plurality of scanning lines 80A, 80B, 80C, . . . , 80F are set so as to extend in parallel to one another. Each scanning line 80 is set so as to be along the blade span direction, in particular, such that the angle formed with the blade span direction G is zero angular degrees.

Furthermore, the above scanning lines 80 are set on each of the first member 32 and the second member 34, as depicted in FIG. 0.12. In particular, on each of the first member 32 and the second member 34, the scanning lines 80 are set so as to be distributed on each side of the center line C along the blade span direction. Accordingly, it is possible to check a broad range of the first member 32 and the second member 34 efficiently.

The scanning lines 80 set on the first member 32 and the second member 34 may be set so as to be scanned in the order of 80A, 80B, 80C, . . . , and 80F.

Furthermore, the scanning direction of the ultrasound probe 50 at the set scanning lines 80 may be oriented from the blade root portion 12 toward the blade tip portion 14, or from the blade tip portion 14 toward the blade root portion 12.

Furthermore, as depicted in FIG. 11, the putty material 20 (or FRP plate) applied onto the inner wall surface 5 in step S101 is determined so as to include the setting range of each scanning line 80. In this example, while the application range of the putty material 20 (or FRP plate) corresponding to each scanning line 80 is determined independently, the application ranges may be determined integrally.

The plurality of scanning lines are set, for instance, at intervals of 50-200 mm from one another.

Next, a cross-sectional image is obtained by moving the ultrasound probe 50 along the scanning line 80 set in step S104 (step S105). Such acquisition of a cross-sectional image is carried out by performing B scan in the ultrasound probe system. The B scan is a single-value B scan, which is a function to display a vertical cross-sectional image of the reflection source from the information on the position and the depth of the ultrasound probe. In the present working example, while moving the ultrasound probe 50 along the scanning line 80, information on the position of the ultrasound probe obtained by the encoder 60 and information on the depth obtained by the probe body 52 are acquired, and a cross-sectional image of the outer skin is obtained by associating the information.

Figure 13:
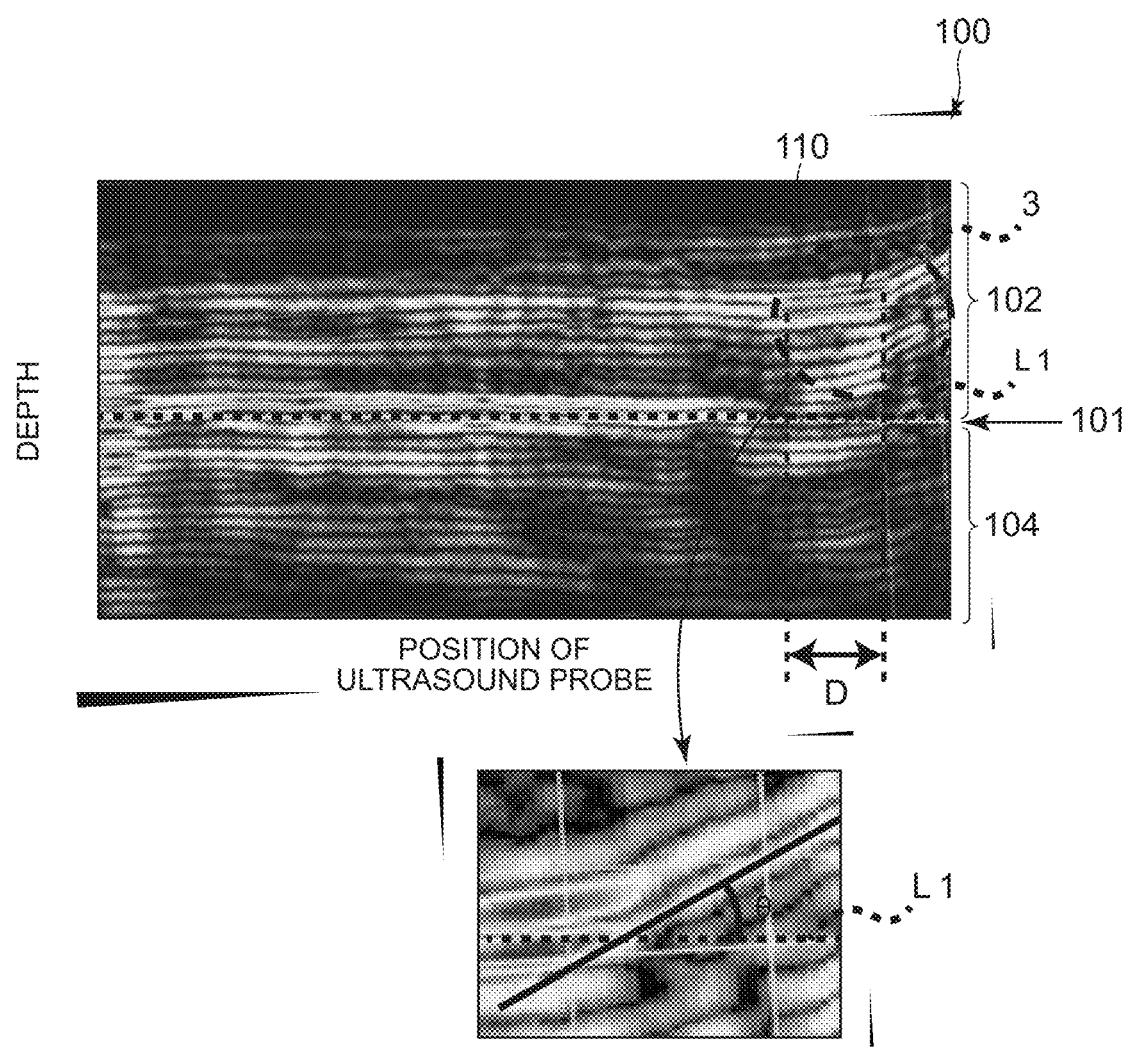
FIG. 13 is an example of a cross-sectional image obtained in step S105 of FIG. 6.

FIG. 13 is an example of a cross-sectional image obtained in step S105 in FIG. 6. The x-axis of FIG. 13 represents the position of the ultrasound probe along the scanning line 80, and the y-axis of FIG. 13 represents the depth at the position of each ultrasound probe. The points in the cross-sectional image indicate reflection echoes that occur from reflection of ultrasound waves emitted from the ultrasound probe 50 on the laminated bodies constituting the outer skin to be measured, and the reflection echoes are displayed in different shades depending on the strength. Accordingly, stripes that correspond to the laminated bodies constituting the outer skin are obtained as an echo level distribution.

Next, the cross-sectional image obtained in step S105 is displayed real-time on the display device such as a monitor, and the worker confirms the measurement result on the monitor and determine whether the measurement result is appropriate (step S106). The items in this confirmation work include whether there is missing data or discontinuity, whether there is discontinuity of echo near the partition wall plate 46, and whether there is a site with a high bottom echo from the outer surface or a site with a low echo of warp, for instance. If any of the above items is determined to be inappropriate (step S106: NO1), the process returns to step S105 and the cross-sectional image is re-captured.

Furthermore, if there is discontinuity of echo or if it is determined that the reflection echo from the boundary surface to the applied putty material 20 (or FRP plate) is determined to be high in step S106 (step S106; NO2), the process returns to step S101, the putty material 20 or the FRP plate is applied again, and measurement is carried out again.

Figure 14:
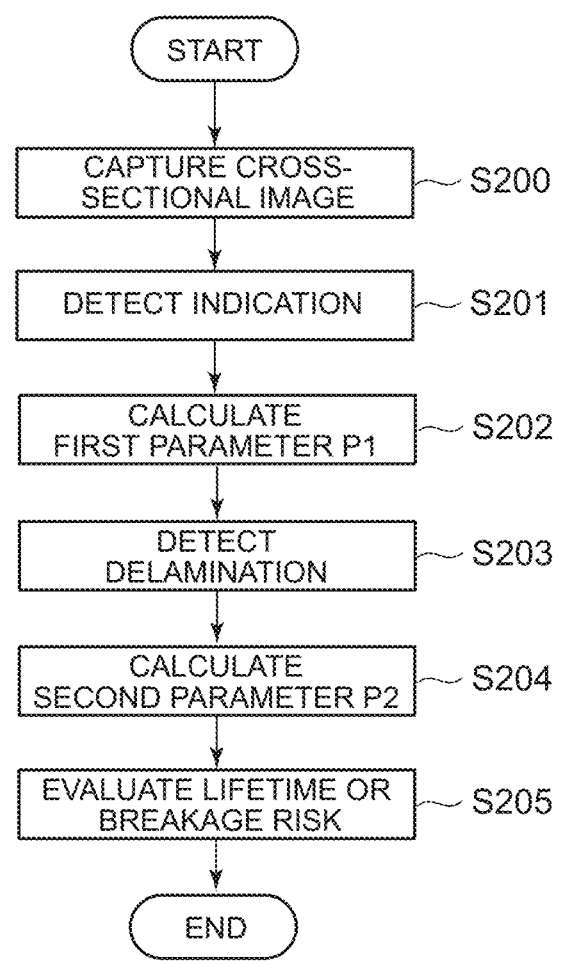
FIG. 14 is a sub flowchart showing steps of a method of evaluating quality of a wind turbine blade performed in step S106 of FIG. 6.

Next, on the basis of the cross-sectional image obtained in step S105, each check item is evaluated to evaluate the quality of the wind turbine blade (step S107). Herein, FIG. 14 is a sub flowchart showing steps of a method of evaluating quality of a wind turbine blade performed in step S106 in FIG. 6.

The following method of analyzing the cross-sectional image may be performed by a worker, or by using an electronic computation device such as a computer. In the latter case, an image analysis device may be configured by installing a program for performing the cross-sectional image analysis method on an electronic computation device, which is hardware. In this case, the program may be recorded in advance in a storing medium such as a hard disc or a memory, and then downloaded to the electronic computation device by a predetermined reading device.

Analysis of the cross-sectional image starts from acquisition of a cross-sectional image 100 to be evaluated (step S200). Herein, the cross-sectional image depicted in FIG. 13 will be used in description as an example. The cross-sectional image shows a bottom echo 101 being a reflection echo which corresponds to the outer surface of the outer skin (opposite to the inner surface that the ultrasound probe 50 makes contact). Between the bottom echo 101 and the inner surface (position of zero depth), a reflection echo 102 corresponding to the laminated bodies that constitute the outer skin is shown in a stripe pattern.

When analyzing the cross-sectional image, the reflection echo 104 opposite to the bottom echo 101 as seen from the surface where the ultrasound probe 50 is positioned (inner surface) is a secondary or later reflection echo which is unnecessary in the present analysis, and may be ignored.

Next, an indication 110 is detected from the cross-sectional image 100 obtained in step S200 (step S201). The indication 110 is extracted as a region where the echo level is greater than the first threshold E1, from the echo distribution (excluding the bottom echo and the secondary and later reflection echo) shown in the cross-sectional image 100. While the first threshold E1 may be an absolute value, in the present working example, the first threshold E1 is determined relative to the background echo level E0. In this way, even in a case where the background echo level changes (e.g. the gain of the ultrasound probe is adjusted so that the cross-sectional image is easier to understand), the region whose reflection echo has a predetermined ratio of strength is specified as the indication 110. That is, in the cross-sectional image 100 in FIG. 13, the range having a shade of a certain level of darkness or higher is specified as the indication 110.

Furthermore, the indication 110 represents a situation inside the laminated bodies that can be detected by the ultrasound probe 50, which does not reach a delamination 120 described below. For instance, warp or the like can be treated as an indication that indicates a situation where a layer forming the laminated bodies is inclined at a predetermined angle from a reference.

Next, a characteristic region R is selected from the indication 110 detected in step S201, and the inclination of the indication 110 in the characteristic region R is obtained as the first parameter P1 (step S202). The characteristic region R is selected as a region where the inclination with respect to the reference line L1 is shown over a predetermined range in the cross-sectional image 100 is shown, for instance. In the example of FIG. 13, the characteristic region R is shown surrounded by a dotted line, and a partial enlarged view of the characteristic region R is depicted. Herein, the reference line L1 is, for instance, determined as a line parallel to the scanning line 80 or the bottom echo 101. Further, by performing fitting on the indication 110 included in the characteristic region, the inclination θ of the indication 110 with respect to the reference line L1 is obtained.

Next, a delamination 120 is detected from the cross-sectional image obtained in step S200 (step S203). The delamination 120 is extracted as a region where the echo level is greater than the second threshold E2, or an indication 110 whose inclination θ obtained in step S202 is not smaller than a predetermined angle despite the echo level not being greater than the second threshold E2, from the echo distribution shown in the cross-sectional image 100. The second threshold E2 is set to be greater than the first threshold E1 used in extraction of the indication 110. That is, there are two types of phenomena that are treated as a delamination 120, and one of them is a region where the echo strength is not lower than the second threshold E2. This is, a region that generates a stronger reflection echo than the indication 110 is regarded as a delamination 120. The other one does not generate a reflection echo as strong as the former one, but an indication 110 having a great inclination θ means a great warp of the laminated bodies and has a high risk of future damage, and thus should be regarded as a delamination 120.

Next, for the delamination 120 detected in step S203, the characteristic amount is obtained as the second parameter P2 (step S204). The characteristic amount may be a parameter related to the shape of the delamination 120 shown in the cross-sectional image 100. In the present working example, as an example of parameter, the length D along the scanning line 80 of the delamination 120 is used.

In FIG. 13, of the indication 110, a region with a particularly high echo level is detected as a delamination 120, and D in the drawing indicates the length of the delamination 120 along the scanning line 80.

Herein, the evaluation example of the first parameter P1 and the second parameter P2 will be described in detail using some cross-sectional images as examples. FIGS. 15 to 19A and 19B are measurement examples of cross-sectional images.

Figure 15:
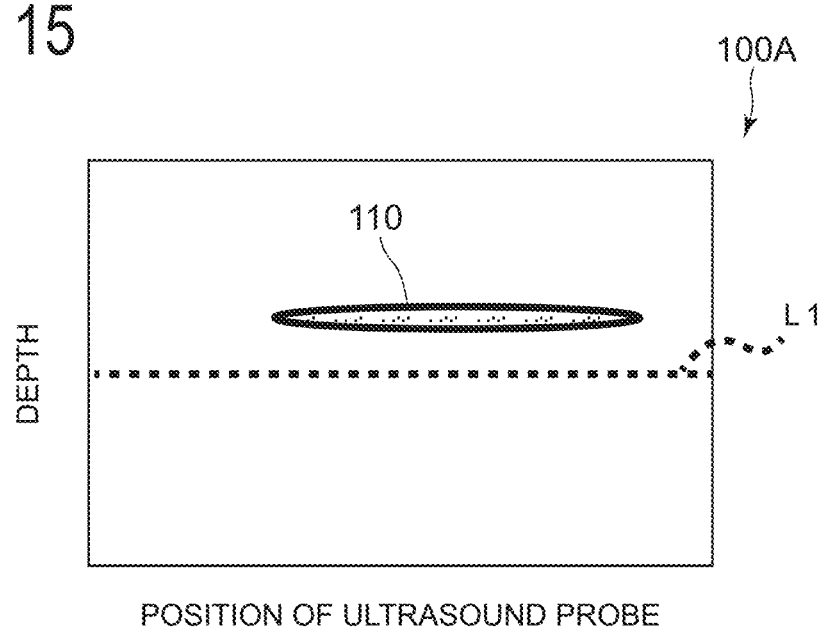
FIG. 15 is a cross-sectional image according to the first measurement example.

FIG. 15 shows a cross-sectional image 100A according to the first measurement example, where no delamination 120 exists and only the indication 110 is shown. The indication 110 in the cross-sectional image A is parallel to the reference line L1, and thus the inclination θ is zero. Thus, the first parameter P1 and the second parameter P2 are both zero, and can be evaluated as a normal state.

Figure 16:
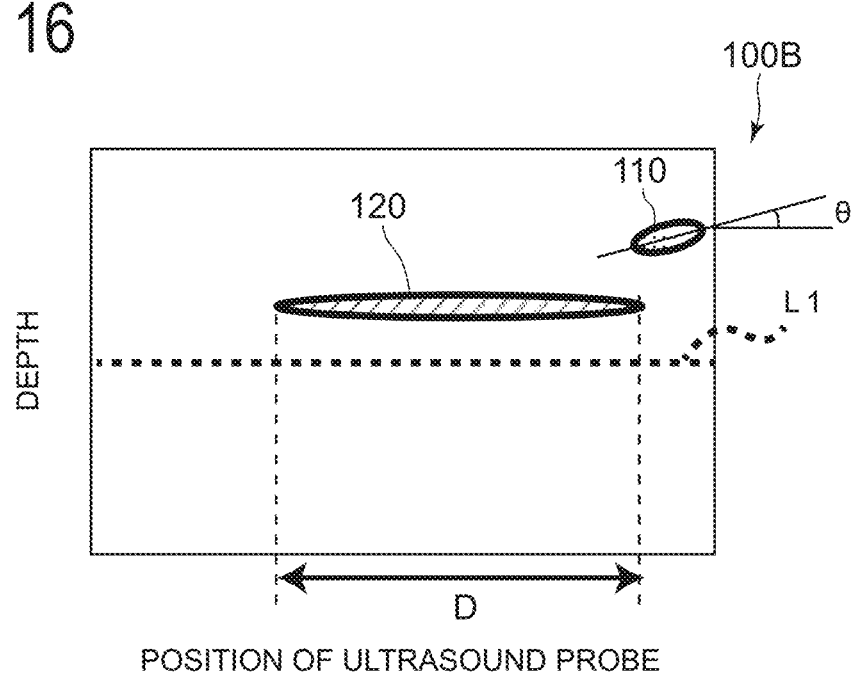
FIG. 16 is a cross-sectional image according to the second measurement example.

FIG. 16 shows a cross-sectional image 100B according to the second measurement example, where both of the indication 110 and the delamination 120 exist similarly to FIG. 13. Thus, for the indication 110, inclination θ of the reference line L1 with respect to the fitting line is specified as the first parameter P1, and for the delamination 120, the length D along the scanning line 80 is specified as the second parameter P2.

Figure 17:
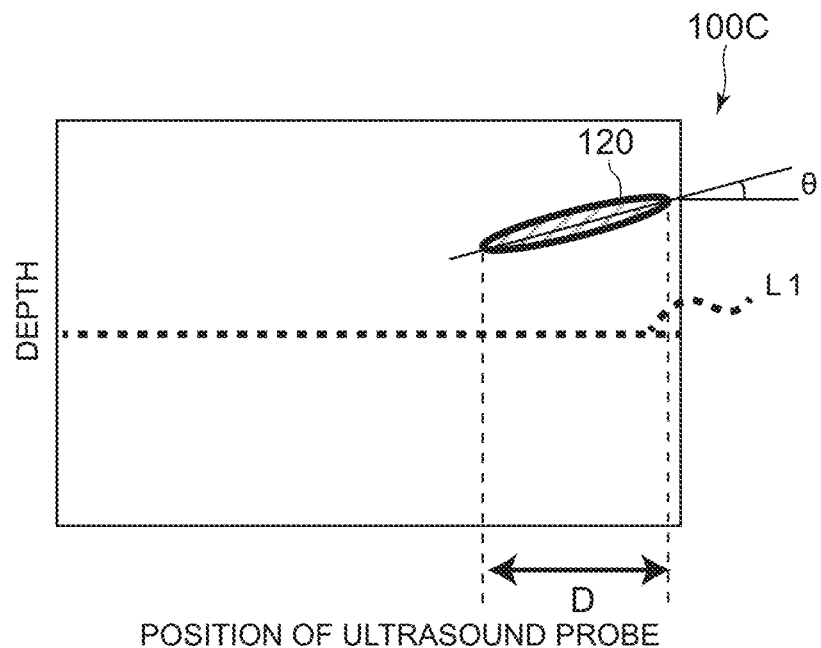
FIG. 17 is a cross-sectional image according to the third measurement example.

FIG. 17 shows a cross-sectional image 100C according to the third measurement example, where no indication 110 exists and only the delamination 120 is shown. For the delamination 120, inclination θ of the reference line L1 with respect to the fitting line is specified as the first parameter P1, and the length D along the scanning line 80 is specified as the second parameter P2.

Figure 18:
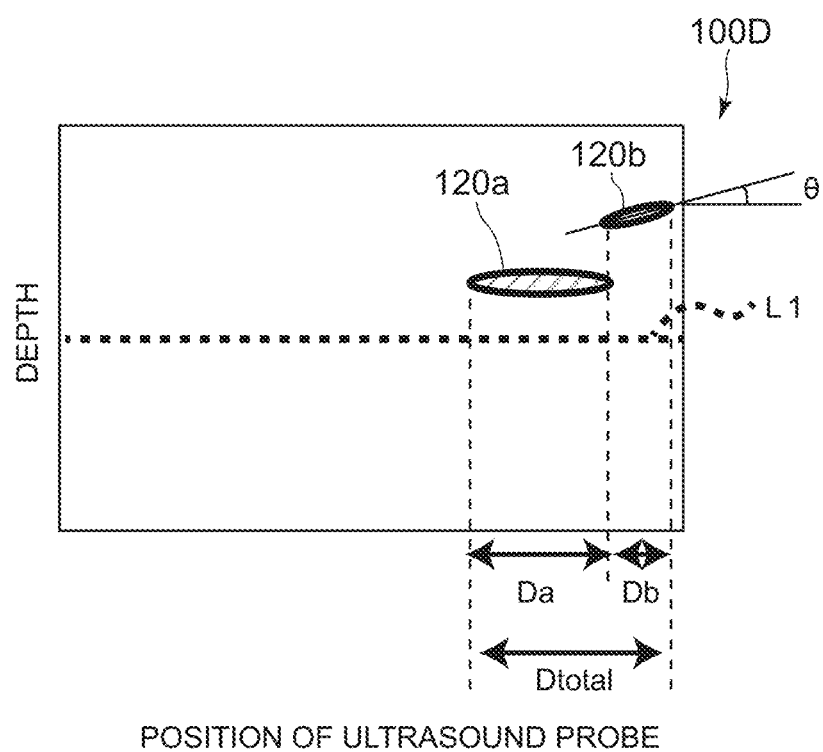
FIG. 18 is a cross-sectional image according to the fourth measurement example

FIG. 18 shows a cross-sectional image 100D according to the fourth measurement example, where no indication 110 exists and a plurality of delaminations 120a, 120b are shown. In a case where a plurality of delaminations 120a, 120b exist in a single cross-sectional image 100D, the total length $D_{total}$ (=Da+Db) along the scanning line 80 over the entire delamination 120 is treated as the second parameter P2. By using the total length $D_{total}$ as the second parameter P2 as described above, it is possible to perform evaluation taking into account the plurality of delaminations 120a, 120b that exist in a single cross-sectional image 100.

Furthermore, since the delamination 120b is inclined with respect to the reference line L1, the inclination angle θ is specified as the first parameter P1.

Figure 19A:
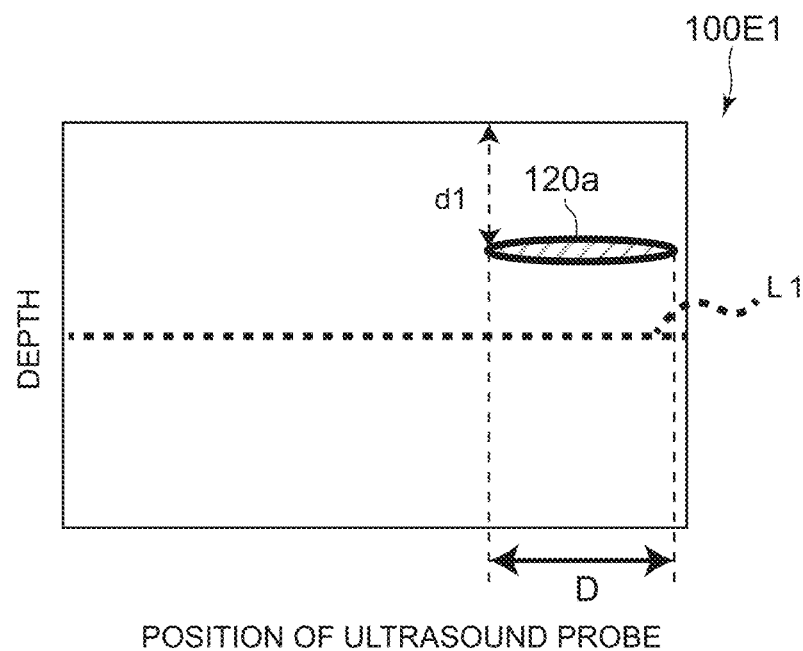
FIG. 19A is a cross-sectional image according to the fifth measurement example.
Figure 19B:
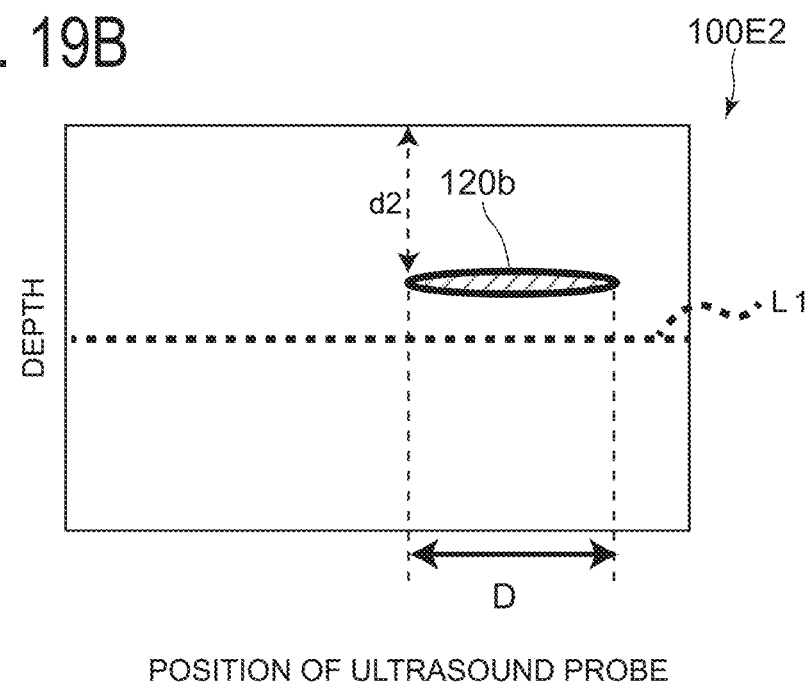
FIG. 19B is a cross-sectional image according to the fifth measurement example.

FIGS. 19A and 19B show cross-sectional images 100E1, 100E2 according to the fifth measurement example. The cross-sectional images 100E1, 100E2 are cross-sectional images obtained on different scanning lines 80 (that is, if a plurality of scanning lines 80 are set in FIGS. 11 and 12, cross-sectional images obtained on different scanning lines 80). The cross-sectional image 100E1 includes a delamination 120a having length D1, and the cross-sectional image 100E2 includes a delamination 120b having length D2. In this case, the total length $D_{total}$ (=D1+D2) of the delaminations 120 detected from the respective scanning lines 80 may be used as the second parameter. Accordingly, it is possible to perform evaluation taking into account the plurality of delaminations 120a, 120b detected from the plurality of scanning lines 80.

In this case, when obtaining the total length $D_{total}$ of the respective delaminations 120, weight may be applied depending on the depth of each delamination 120. In the example of FIGS. 19A and 19B, the total length may be obtained from the following expression:

$$D_{total}=D1\times\alpha 1+D2\times\alpha 2,$$

where α1 is the weighting coefficient corresponding to the depth d1 of the delamination 120a in the cross-sectional image 100E1, and α2 is the weighting coefficient corresponding to the depth d2 of the delamination 120b in the cross-sectional image 100E2. In this case, the weighting coefficients α1, α2 may be preferably set so as to increase as the depths of delaminations 120 included in the cross-sectional image 100 increase toward the center part of the outer skin. Accordingly, it is possible to evaluate quality taking into account the influence of the depth of delaminations 120 on the lifetime or breakage risk of the outer skin.

Furthermore, when obtaining the total length $D_{total}$ of the respective delaminations 120, weight may be applied depending on the number of delaminations 120 included in each cross-sectional image 100. For instance, the total length may be obtained from the following expression:

$$D_{total}=D1\times\beta 1+D2\times\beta 2,$$

where β1 is the weighting coefficient corresponding to the number N1 of the delamination 120a included in the cross-sectional image 100E1, and β2 is the weighting coefficient corresponding to the number N2 of the delamination 120b in the cross-sectional image 100E2. In this case, the weighting coefficients β1, β2 may be preferably set so that the weighting coefficients β1, β2 increase as the number N of delaminations 120 included in the cross-sectional image 100 increases. Accordingly, it is possible to evaluate quality taking into account the influence of distribution density of delaminations 120 on each scanning line 80 on the lifetime or breakage risk of the outer skin.

Furthermore, when obtaining the total length $D_{total}$ of the respective delaminations 120, weight may be applied depending on the distance from the center line C of the scanning line 80 corresponding to each cross-sectional image 100 (see FIG. 11). For instance, the total length may be obtained by the following expression:

$$D_{total}=D1\times\gamma1+D2\times\gamma2,$$

where γ1 is the weighting coefficient corresponding to the distance R1 from the center line C of the scanning line 80*a* corresponding to the cross-sectional image 100E1, and γ2 is the weighting coefficient corresponding to the distance R2 from the center line C of the scanning line 80*b* corresponding to the cross-sectional image 100E2. In this case, the weighting coefficients γ1, γ2 may be preferably set so that the weighting coefficients γ1, γ2 increase as the distance R from the center line C of the scanning line 80 corresponding to the cross-sectional image 100 decreases. Accordingly, it is possible to evaluate quality taking into account the greater influence of delamination that is closer to the center line C, on the lifetime and/or breakage risk of the wind turbine blade.

Next, on the basis of at least one of the first parameter P1 obtained in step S202 or the second parameter P2 obtained in step S204, the lifetime or breakage risk of the wind turbine blade 2 is evaluated (step S205). In evaluation based on the first parameter P1, quality is evaluated based on warp included in the outer skin formed of laminated bodies, from the inclination θ of the indication 110 included in the cross-sectional image 100. On the other hand, in evaluation based on the second parameter P2, quality evaluation is performed based on the delamination 120 included in the outer skin formed of laminated bodies. In the present embodiment, as an example of such an evaluation method, evaluation of the lifetime or breakage risk of the wind turbine blade 2 based on both of the first parameter P1 and the second parameter P2 will be described. By performing quality evaluation in both terms, it is possible to perform quality evaluation with high quality compared to a case where quality evaluation is performed in only one of the terms.

In the evaluation of step S205, with respect to the first parameter P1 and the second parameter P2, an evaluation parameter P3 that quantitatively shows the lifetime and/or breakage risk of the wind turbine blade 2 may be obtained. This evaluation parameter P3 is set so that the lifetime of the wind turbine blade 2 decreases and/or the breakage risk of the wind turbine blade 2 increases with an increase of the first parameter P1 or the second parameter P2.

Figure 20:
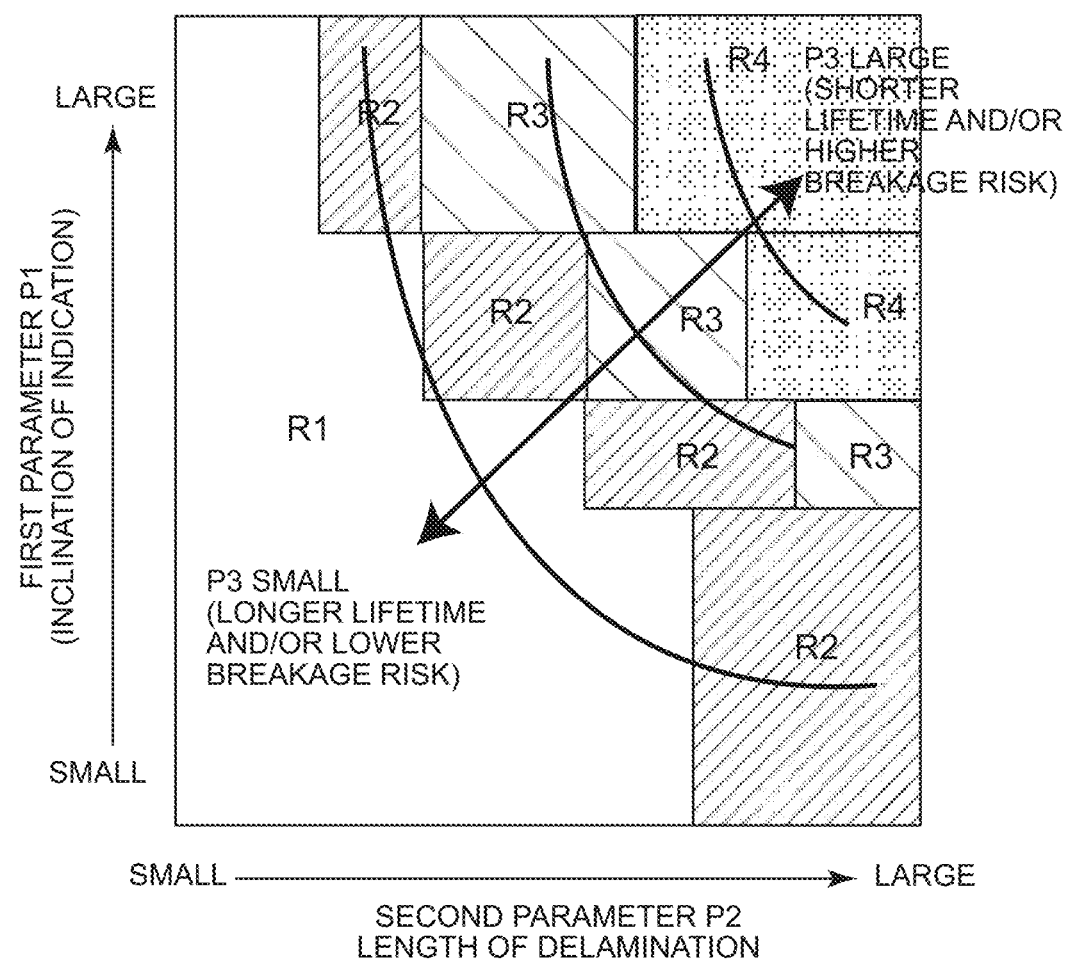
FIG. 20 is an example of a 2D map showing the distribution of evaluation parameters with respect to the first parameter and the second parameter.

FIG. 20 is an example of a 2D map showing the distribution of the evaluation parameter P3 with respect to the first parameter P1 and the second parameter P2. In this example, the evaluation parameter P3 is determined so that the lifetime of the wind turbine blade 2 decreases and/or the breakage risk of the wind turbine blade 2 increases with an increase of the first parameter P1. This means that an increase of the inclination θ of indication 110 indicates that warp in the outer skin is great. As the warp in the outer skin increases, a new delamination 120 is more likely to occur, or an existing delamination 120 may develops and breakage is more likely to occur. Furthermore, the evaluation parameter P3 is determined so that the lifetime of the wind turbine blade 2 decreases and/or the breakage risk of the wind turbine blade 2 increases with an increase of the second parameter P2. This is because, as the length of a delamination 120 increases, the range of the delamination 120 expands, and the risk of breakage increases.

Further, as depicted in FIG. 20, the evaluation parameter P3 may be classified into ranks in stages on the basis of the magnitudes of the first parameter P1 and the second parameter P2. In the present example, the evaluation parameters P3 are classified into four ranks corresponding to the maintenance measure described below. Specifically, the evaluation parameters P3 are divided into the first rank R1 whose condition is not serious and does not need a maintenance measure, the second rank R2 that needs resin injection or the like as a maintenance measure, the third rank R3 that needs reinforcement as a maintenance measure, and the fourth rank R4 that needs replacement as a maintenance measure.

As the check of a single scanning line 80 is completed as described above, it is determined whether there is next scanning line 80 (step S108). If there is next scanning line 80 (step S108: YES), the process returns to step S105, and the same check is performed on the next scanning line 80. If there is no next scanning line 80 (step S108: NO), the above check results are recorded and stored (step S109). The check results are stored in a storing medium such as a hard device, where check information such as check date and check personnel is associated with the data of cross-sectional image obtained in the check.

Next, the maintenance measure of the wind turbine blade 2 may be considered on the basis of the evaluation result obtained from the check. For instance, on the basis of the evaluation parameter P3, which is a quantitative index obtained in step S205, a corresponding maintenance measure is selected. Specifically, as described above with reference to FIG. 20, a maintenance measure corresponding to the first parameter P1 and the second parameter P2 is selected.

In a case of the present embodiment described with reference to FIG. 20, evaluation is performed on the basis of the absolute value of the evaluation parameter P3. Nevertheless, relative evaluation may be performed. For instance, a similar check may be performed on a plurality of wind turbine blades 2, and in a case where the results thereof are sorted in the descending order of the evaluation parameters P3, it may be determined that a predetermined maintenance is required for the wind turbine blade 2 that falls in the highest few percentages.

Modified Example

Figure 21:
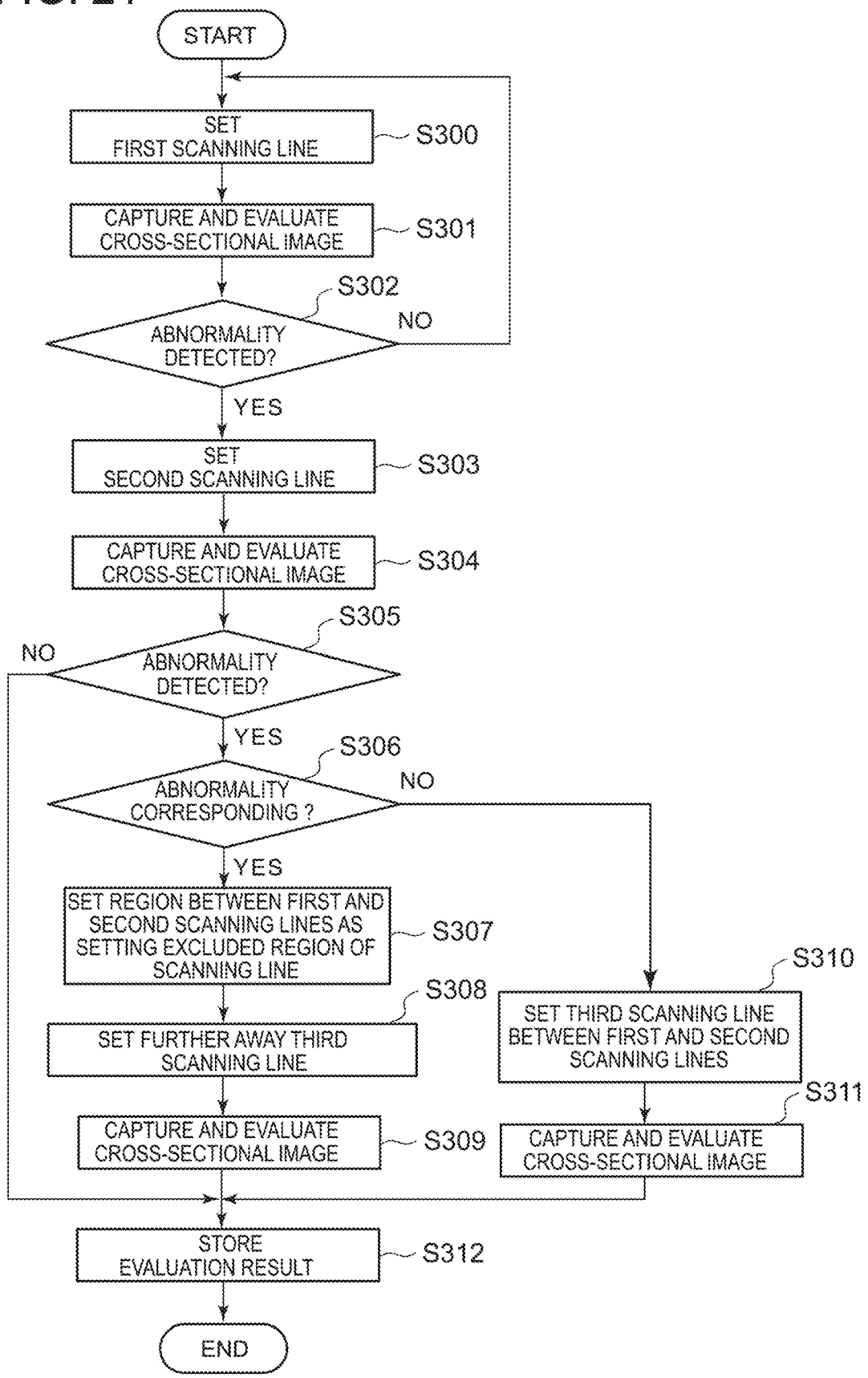
FIG. 21 is a flowchart showing steps of a method of evaluating quality of a wind turbine blade according to a modified example.
Figure 22:
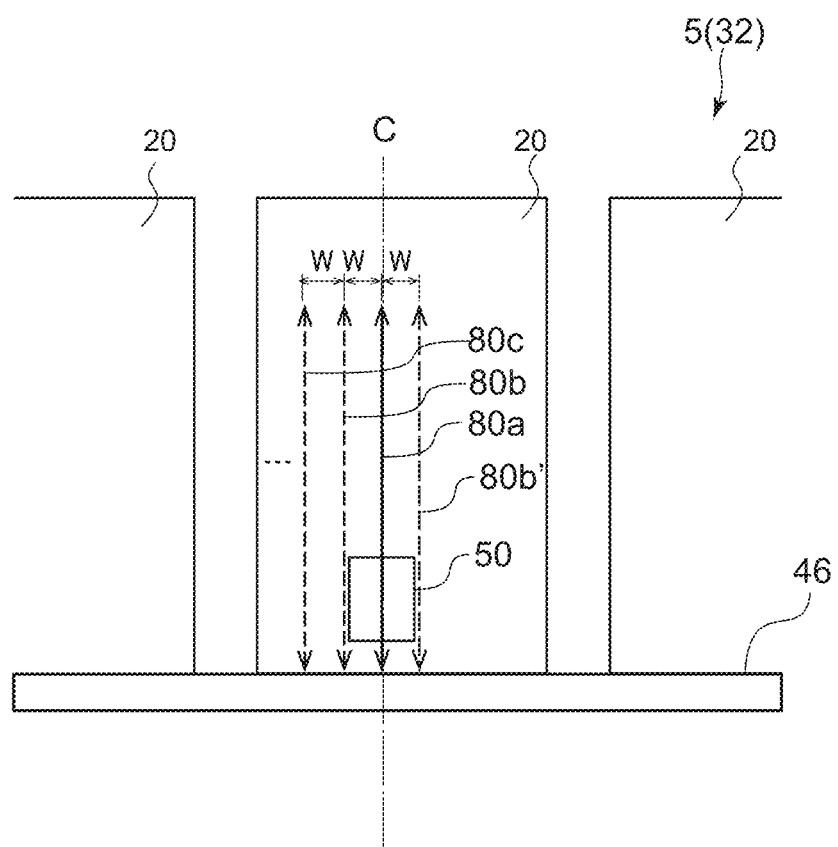
FIG. 22 is a schematic diagram showing the procedure of setting the scanning line in a modified example.

In the above embodiment, the ultrasound probe is moved along the pre-set scanning line 80. Nevertheless, as in the modified example described below, the scanning line 80 may be set in sequence while moving the ultrasound probe 50. FIG. 21 is a flowchart that shows steps of the method of evaluating quality of a wind turbine blade according to a modified example, and FIG. 22 is a schematic diagram showing the procedure of setting the scanning line in a modified example.

The following description focuses on scanning of the ultrasound probe 50 in the check and setting of the scanning line 80, and other various works associated with the check are similar to those in the above described embodiments and not described again.

First, the first scanning line 80*a* along the blade span direction is set (step S300), and the ultrasound probe 50 is moved along the first scanning line 80*a* to obtain the cross-sectional image 100 to perform evaluation (step S301). As a result of evaluation of step S301, it is determined whether the indication 110 or the delamination 120 showing abnormality on the first scanning line 80*a* is detected (step S302).

In a case where an indication 110 or a delamination 120 showing abnormality is not detected in step S302 (step S302: NO), the process returns to S300, and the above work is repeated after re-setting the first scanning line 80*a* to a different position (position away from the previous first scanning line 80a by a predetermined distance (e.g. 50-200 mm) in the blade width direction).

If an indication 110 or a delamination 120 that indicates abnormality is detected in step S302 (step S302: YES), the second scanning line 80b is set at a position away from the first scanning line 80a by a predetermined distance W (step S303). The scanning line 80b is set along the blade span direction similarly to the first scanning line 80a, and is set parallel to the first scanning line 80a, for instance. Further, the ultrasound probe 50 is moved along the second scanning line 80b to obtain the cross-sectional image 100 for evaluation (step S304). As a result of evaluation of step S304, it is determined whether the indication 110 or the delamination 120 showing abnormality on the second scanning line 80b is detected (step S305).

In a case where an indication 110 or a delamination 120 showing abnormality is not detected in step S305 (step S305: NO), the process returns to S303, and the above work is repeated after re-setting the second scanning line 80b to a different position (position away from the first scanning line 80a by a predetermined distance W (e.g. 50-200 mm) in the opposite blade width direction to the previous second scanning line 80b) (see the reference sing 80b' in FIG. 22).

On the other hand, if an indication 110 or a delamination 120 showing abnormality is detected in step S305 (step S305: YES), it is determined whether the indication 110 or the delamination 120 corresponds to the indication 110 or the delamination 120 detected from the first scanning line 80a (step S306). For instance, if the indication 110 or the delamination 120 detected from the second scanning line 80b has a similar trend to the indication 110 or the delamination 120 detected from the first scanning line 80a, it is determined that the two are corresponding.

If such correspondence is determined in step S306 (step S306: YES), it is determined that common indications 110 or delaminations 120 exist between the first scanning line 80a and the second scanning line 80b, and the range (between the first scanning line 80a and the second scanning line 80b) is set as a setting excluded region that is excluded from the setting region of the scanning line 80 (step S307).

In this case, when evaluation at the second scanning line 80b is completed, the third scanning line 80c is set at a position away from the second scanning line 80b by a predetermined distance W (step S308). The third scanning line 80c is set on the opposite side to the first scanning line 80a with respect to the second scanning line 80b, and thereby set to a position avoiding the setting excluded region specified in step S307. Further, the ultrasound probe 50 is moved along the third scanning line 80c, and similar evaluation is performed (step S309). The above works are performed repeatedly until no more indication 110 or delamination 120 appears (or reaches the outside of the application range of the putty material 20 or FRP plate) while moving the setting position of the scanning line 80 by a predetermined distance W. Accordingly, it is possible to specify a range where a common indication 110 or delamination 120 is formed.

The range between the two scanning lines 80 from which corresponding indications 110 or delaminations 120 are detected is regarded as a region where common indications 110 or delaminations 120 exist and set as a setting excluded region, and another scanning line 80 is set avoiding the setting excluded region. In this way, it is possible to check the distribution state of the indications 110 or the delaminations 120 efficiently even for a target object having a broad range such as the wind turbine blade 2.

On the other hand, if it no correspondence is determined in step S306 (step S306: NO), the third scanning line 80c is set between the first scanning line 80a and the second scanning line 80b (step S310), and the ultrasound probe 50 is moved along the third scanning line 80c, repeating similar evaluation (step S311). In this case, the indications 110 or the delaminations 120 detected from the two scanning lines 80 are regarded as indications 110 or delaminations 120 that are independent from one another. Further, by adding the third scanning line 80c between the two scanning lines 80, the range can be checked in more detail.

Further, the above check results are stored in a predetermined storage device, where the position information of each scanning line 80 is associated to the evaluation content (step S312). With regard the checked range, if there is image data or the like such as a photo, the image data may be also associated and stored.

As described above, in the modified example, the scanning lines 80 are set one in sequence in the above pattern on the outer skin of the wind turbine blade 2, and thereby it is possible to detect an indication 110 or a delamination 120 efficiently over a broad range, which enables high quality evaluation.

INDUSTRIAL APPLICABILITY

At least one embodiment of the present invention can be applied to a method of evaluating quality of a wind turbine blade including a laminated body.

DESCRIPTION OF REFERENCE NUMERALS

1 Wind turbine
2 Wind turbine blade
3 Blade body
4 Hub
5 Inner wall surface
6 Wind turbine rotor
7 Outer wall surface
8 Nacelle
10 Blade-thickness changing portion
11 Tower
12 Blade root portion
14 Blade tip portion
20 Putty material
32 First member
34 Second member
36 Shear web
46 Partition wall plate
48 Removal range
50 Ultrasound probe
52 Probe body
54 Side plate
56 Guide member
60 Encoder
65 Arm
70 Calibration block
80 Scanning line

The invention claimed is:
1. A method of evaluating quality of a wind turbine blade which has a hollow structure where an interior space of the wind turbine blade is surrounded by an outer skin which includes a laminated body, the method comprising:
an ultrasound probe scanning step of moving an ultrasound probe along at least one scanning line which is set on at least a part of an inner wall surface or an outer wall surface of the outer skin;

a cross-sectional image generating step of generating a cross-sectional image of the outer skin corresponding to the at least one scanning line, on the basis of a position of the ultrasound probe on the at least one scanning line and a reflection echo at the position;

an indication detection step of detecting, from the cross-sectional image, an indication having an echo level that is greater than a first threshold;

a first parameter calculation step of obtaining, as a first parameter, an inclination of the indication with respect to the at least one scanning line or a reference line included in the cross-sectional image;

a delamination detection step of detecting, from the cross-sectional image, a delamination having an echo level that is greater than a second threshold which is set to be greater than the first threshold;

a second parameter calculation step of obtaining, as a second parameter, a characteristic amount of the delamination;

an evaluation parameter calculation step of obtaining an evaluation parameter to quantitatively evaluate a lifetime or a breakage risk of the wind turbine blade on the basis of the first parameter and the second parameter; and an evaluation step of evaluating a lifetime or a breakage risk of the wind turbine blade by classifying the evaluation parameter into ranks in stages on the basis of a magnitude of the first parameter and the second parameter on the basis of the first parameter.

2. The method of evaluating quality of the wind turbine blade according to claim 1,
wherein the evaluation step includes evaluating the lifetime or the breakage risk of the wind turbine blade so that the lifetime of the wind turbine blade decreases and/or the breakage risk of the wind turbine blade increases with an increase of the first parameter or the second parameter.

3. The method of evaluating quality of the wind turbine blade according to claim 1,
wherein the second parameter is a length of the delamination along the at least one scanning line.

4. The method of evaluating quality of the wind turbine blade according to claim 1,
wherein, if a plurality of the delaminations are detected from the cross-sectional image in the delamination detection step, the second parameter is a sum of lengths of the respective delaminations along a blade span direction.

5. The method of evaluating quality of the wind turbine blade according to claim 1,
wherein the at least one scanning line comprises a plurality of scanning lines which extend parallel to one another, and
wherein, if a plurality of delaminations are detected from at least two of the plurality of scanning lines, the second parameter is a sum of characteristic amounts of the delaminations detected from the at least two respective scanning lines.

6. The method of evaluating quality of the wind turbine blade according to claim 5,
wherein the second parameter is obtained by applying greater weights to the characteristic amounts of the delaminations with greater depths detected from the at least two respective scanning lines and adding the weighted characteristic amounts of the delaminations.

7. The method of evaluating quality of the wind turbine blade according to claim 5,
wherein the second parameter is obtained by applying weights to the characteristic amounts of the delaminations detected from the at least two respective scanning lines, using weight coefficients which are set according to the number of the delaminations detected in the cross-sectional image, and adding the weighted characteristic amounts of the delaminations.

8. A method of evaluating quality of a wind turbine blade which has a hollow structure where an interior space of the wind turbine blade is surrounded by an outer skin which includes a laminated body, the method comprising:

an ultrasound probe scanning step of moving an ultrasound probe along at least one scanning line which is set on at least a part of an inner wall surface or an outer wall surface of the outer skin;

a cross-sectional image generating step of generating a cross-sectional image of the outer skin corresponding to the at least one scanning line, on the basis of a position of the ultrasound probe on the at least one scanning line and a reflection echo at the position;

an indication detection step of detecting, from the cross-sectional image, an indication having an echo level that is greater than a first threshold;

a first parameter calculation step of obtaining, as a first parameter, an inclination of the indication with respect to the scanning line or a reference line included in the cross-sectional image;

a delamination detection step of detecting, from the cross-sectional image, as a delamination, an area having an echo level that is greater than a second threshold which is set to be greater than the first threshold and an area having the echo level that is not greater than the second threshold and the inclination that is not smaller than a predetermined angle;

a second parameter calculation step of obtaining, as a second parameter, a characteristic amount of the delamination; and an evaluation step of evaluating a lifetime or a breakage risk of the wind turbine blade on the basis of the first parameter and the second parameter.

* * * * *